United States Patent [19]

Fukino et al.

[11] Patent Number: 4,513,835

[45] Date of Patent: Apr. 30, 1985

[54] STEERING CONTROL APPARATUS

[75] Inventors: Masato Fukino, Yokohama; Tokiyoshi Yanai, Yokosuka; Hirotsugu Yamaguchi, Chigasaki; Yutaka Aoyama, Yokosuka, all of Japan

[73] Assignee: Nissan Motor Company, Limited, Yokohama, Japan

[21] Appl. No.: 480,820

[22] Filed: Mar. 31, 1983

[30] Foreign Application Priority Data

Apr. 30, 1982 [JP] Japan .................................. 57-72699
Apr. 30, 1982 [JP] Japan .................................. 57-72703

[51] Int. Cl.³ ............................................. B62D 5/08
[52] U.S. Cl. .................................................. 180/142
[58] Field of Search ........................ 180/141, 142, 143

[56] References Cited

U.S. PATENT DOCUMENTS 3,011,579 12/1961 Milliken et al. ..................... 180/142
4,131,176 12/1978 Ruoff .................................. 180/142
4,300,650 11/1981 Weber ................................. 180/142
4,473,128 9/1984 Nakayama .......................... 180/142

FOREIGN PATENT DOCUMENTS 52-95424 8/1977 Japan .

Primary Examiner—John A. Pekar
Attorney, Agent, or Firm—Lane, Aitken & Kananen

[57] ABSTRACT

A steering control apparatus for a power-assisted vehicle steering system for a vehicle, comprising a steering pressure pump, a power cylinder, a pressure control valve operative to direct fluid under pressure from the pump to the power cylinder to develop in the cylinder a differential fluid pressure to produce a controlled degree of hydraulic steering assistance, and a fluid flow control valve bypassing the pressure control valve between the suction and delivery ports of the pump, wherein the differential fluid pressure to be developed in the power cylinder or the flow rate of the fluid to be discharged through the flow control valve is variable in two or more different basic modes in each of which the differential fluid pressure or the fluid flow rate is further continuously variable so that the vehicle driver is enabled to steer the vehicle with a manual steering effort continuously variable with, for example, the vehicle speed.

9 Claims, 16 Drawing Figures

STEERING CONTROL APPARATUS

FIELD OF THE INVENTION

The present invention relates to a fluid-operated steering control apparatus for a power-assisted vehicle steering system of a vehicle such as an automotive vehicle having steerable road wheels. More particularly, the present invention relates to a fluid-operated steering control apparatus having different basic modes of control over the steering fluid pressure to achieve various degrees of hydraulic steering assistance responsive to varying operational conditions of a vehicle with steerable road wheels.

DESCRIPTION OF THE PRIOR ART

A typical example of a prior-art using a fluid-operated steering control apparatus having different modes of control over the steering fluid pressure to be developed in the steering system is taught in Japanese Provisional Publication of Pat. No. 52-95424. In the vehicle steering system disclosed therein, the steering assistance fluid pressure is controlled in two different modes depending upon the vehicle speed. The vehicle driver is thus required to apply relatively large manual steering efforts to the steering wheel at some vehicle speeds and is permitted to apply relatively small manual steering efforts at other vehicle speeds. Such a steering control apparatus comprises a steering power cylinder having two fluid chambers formed across a piston, and a steering gear assembly providing engagement between the steering shaft and the cylinder piston so that the piston is axially movable with turning motion of the steering wheel. The power cylinder is supplied with fluid under pressure from a pump and is bypassed by a bypass passageway which is arranged to allow the fluid to be partially discharged from the fluid circuit so as to reduce the fluid pressure to be developed in the power cylinder and to modify the degree of hydraulic steering assistance depending upon the vehicle speed. The bypass passageway is thus provided with a steering pressure control valve incorporated in the steering gear assembly to control the flow rate of fluid through the bypass passageway. The solenoid-operated pressure control valve is responsive to vehicle speed and is operative to permit fluid therethrough at a rate variable with the vehicle speed. Such a pressure control valve is controlled by means of a control circuit which comprises a voltage generator adapted to produce a signal voltage variable with detected vehicle speed, a comparator to compare the signal voltage from the voltage generator and to produce an output signal when the input signal voltage is higher than a predetermined reference voltage, first control signal generating means operative to produce an output signal in response to the output signal from the comparator, and second control signal generating means operative to produce an output signal in response to the output signal from the comparator and to maintain the output signal for a predetermined duration after the signal is delivered from the comparator. The pressure control valve is actuated to pass fluid therethrough at a rate which is controlled on the basis of the output signal from each of the first and second signal generating means. If an output signal is produced from the first signal generating means in the presence of an output signal from the second signal generating means, the pressure control valve is actuated to pass fluid at an increased rate so that fluid under pressure is supplied at a reduced rate to the power cylinder. When output signals are being produced concurrently by the first and second signal generating means, the vehicle driver is thus required to apply an increased manual steering effort to the steering wheel to compensate for the reduced hydraulic steering assistance achieved by the fluid pressure supplied to the power cylinder. The steering control apparatus of the prior-art vehicle steering system thus constructed and arranged is further characterized by the provision of a normally-open first switch provided between the input terminal of the comparator and a source of a positive constant voltage and a normally-closed second switch provided between the pressure control valve and each of the first and second signal generating means. When the first switch is open with the second switch closed, the pressure control valve operates under the control of the output signal, if any, from the first signal generating means or each of the first and second signal generating means as above described. If the first switch is caused to close with the second switch kept closed, the comparator is caused to produce its output signal irrespective of the signal voltage from the voltage generator so that the pressure control valve is maintained open to allow fluid to be discharged in shunt across the power cylinder. Under these conditions, the steering assistance fluid pressure effective in the steering system is reduced and as a consequence the vehicle driver is required to apply an increased manual steering effort to the steering wheel. If, on the other hand, the second switch is caused to open, the pressure control valve is maintained deenergized and cuts off the flow of fluid therethrough so that the vehicle driver is permitted to steer the vehicle with a reduced manual steering effort applied to the steering wheel. Each of the first and second switches thus arranged is of the manually operated type so that the vehicle driver is enabled to select either of the two modes of steering assistance control during driving.

One of the drawbacks of a prior-art power-assisted vehicle steering system using a steering control apparatus of the above described nature is that selection is open to the vehicle driver between only two modes of control over the hydraulic steering assistance. The vehicle driver is thus permitted to select a larger or smaller manual steering effort and is not enabled to steer the vehicle with a manual steering effort continuously or otherwise variable between the two manual steering efforts. Another drawback is that the vehicle driver is required to frequently manipulate the first and second switches depending upon the road and traffic conditions since the manual steering effort which the vehicle driver is required to apply to the steering wheel is unvariable once he has selected one of the two modes of steering assistance control. The present invention contemplates elimination of these and other drawbacks which have thus far been inherent in a prior-art power-assisted vehicle steering system using a fluid-operated steering control apparatus of the described basic nature.

SUMMARY OF THE INVENTION

In accordance with one outstanding feature of the present invention, there is provided a fluid-operated steering control apparatus for a power-assisted vehicle steering system for a vehicle having a steerable road wheel and a manually driven steering wheel, comprising a steering pressure pump; a steering power cylinder which comprises a piston coupled to the steerable road wheel and which has first and second fluid chambers formed across the piston, the piston being axially movable by a differential fluid pressure developed between the first and second fluid chambers; a steering pressure control valve intervening between the steering power cylinder and of the steering pressure pump and operative to direct fluid under pressure from the steering pressure pump selectively to one of the first and second fluid chambers of the power cylinder and to drain fluid from the other of the fluid chambers at variable rates for developing a differential fluid pressure across the piston; and fluid flow control valve means bypassing the pressure control valve and comprising a valve member movable in first and second directions to provide increasing and decreasing the rate of bypass fluid, solenoid-operated valve actuating means operative to actuate the valve member of the fluid flow control valve means to move in one of the first and second directions of movement thereof, parameter detecting means for detecting a variable operational parameter of the vehicle and producing an output signal representative of the detected value of the operational parameter, and a valve control circuit connected to the valve actuating means and the parameter detecting means and comprising a plurality of signal generators each having stored therein a set of information representative of a predetermined relationship between the operational parameter and desired flow rates of fluid through the fluid flow control valve means, the respective relationships represented by the sets of information stored in the signal generators being different from each other, each of the signal generators being responsive to the output signal from the parameter detecting means and being operative to produce an output signal representative of a target flow rate of fluid through the fluid flow control valve means in response to the output signal from the parameter detecting means, the valve actuating means being operative selectively on the basis of one of the respective output signals from the signal generators.

In accordance with another outstanding feature of the present invention, there is provided a fluid-operated steering control apparatus for a power-assisted vehicle steering system for a vehicle having a steerable road wheel and a manually driven steering wheel, comprising a steering pressure pump having suction and delivery ports; a steering power cylinder which comprises a piston coupled to the steerable road wheel and which has first and second fluid chambers formed across the piston, the piston being axially movable by a differential fluid pressure developed between the first and second fluid chambers; and a steering pressure control valve intervening between the steering power cylinder and the delivery port of the steering pressure pump and between the power cylinder and the suction port of the pump and operative to direct fluid under pressure from the steering pressure pump selectively to one of the first and second fluid chambers of the power cylinder and from the other of the fluid chambers back to the steering pressure pump at variable rates for developing a differential fluid pressure across the piston, the pressure control valve comprising solenoid-operated valve actuating means operative to control the flow rate of fluid therethrough, parameter detecting means for detecting a variable operational parameter of the vehicle and producing an output signal representative of the detected value of the operational parameter, and a valve control circuit electrically connected to the valve actuating means and the parameter detecting means and comprising a plurality of function generators each having stored therein a set of information representative of a predetermined relationship between the operational parameter and the differential fluid pressures to be developed between the first and second fluid chambers of the power cylinder, the respective relationships represented by the sets of information stored in the function generators being different from each other, each of the function generators being responsive to the output signal from the parameter detecting means and being operative to produce an output signal representative of a target differential fluid pressure to be developed between the first and second fluid chambers of the power cylinder in response to the output signal from the parameter detecting means, the valve actuating means being operative selectively on the basis of one of the respective output signals from the function generators.

BRIEF DESCRIPTION OF THE DRAWINGS

The drawbacks of a prior-art steering control apparatus and the features and advantages of a steering control apparatus according to the present invention will be more clearly understood from the following description taken in conjunction with the accompanying drawings in which like reference numerals designate similar or corresponding assemblies, units, members and elements and in which.

DESCRIPTION OF THE PREFERRED EMBODIMENTS

Figure 1:
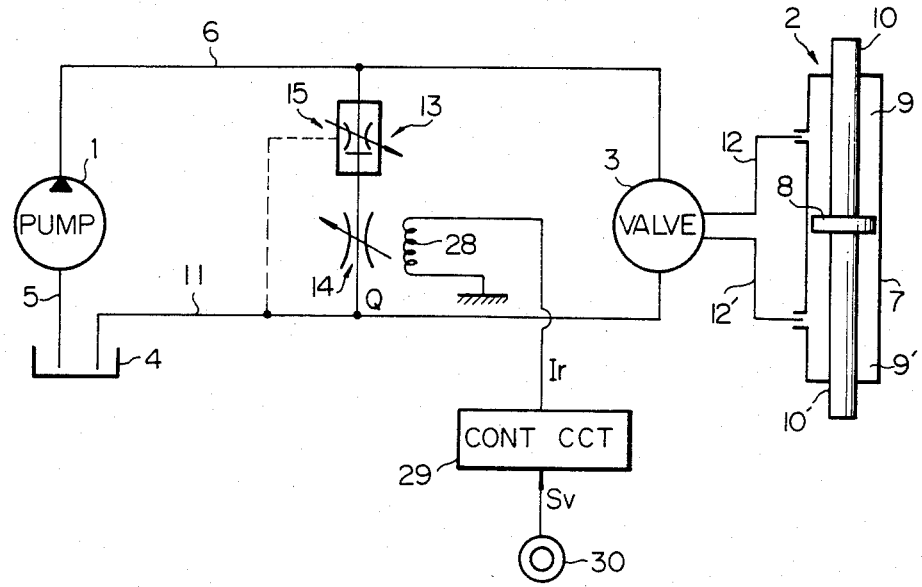
FIG. 1 is a schematic diagram showing the basic, overall construction and arrangement of a preferred embodiment of a fluid-operated steering control apparatus according to the present invention.

Referring to FIG. 1 of the drawings, a fluid-operated steering control apparatus embodying the present invention comprises an engine-driven or motor-driven, constant-displacement, steering pressure pump 1, a steering power cylinder 2 and a steering pressure control valve 3. The steering pressure pump 1 has a suction port communicating with a fluid reservoir 4 through a passageway 5 and a delivery port communicating with the steering pressure control valve 3 through a fluid feed passageway 6. The steering power cylinder 2 comprises a hollow cylinder housing 7 fixedly positioned with respect to the vehicle body structure and a cylinder piston 8 axially movable in the cylinder housing 7 and forming in the cylinder housing 7 first and second variable-volume fluid chambers 9 and 9' which are separate from each other across the cylinder piston 8. The cylinder piston 8 is connected to the wheel axles of front road wheels (not shown) of the vehicle through rods and further through tie rods which axially extend in opposite directions from the piston 8. Though not shown in the drawings, the rods 10 and 10' are engaged with the steering shaft through, for example, a toothed rack formed or fixedly carried on one of the rods 10 and 10' and engaged with a pinion gear coaxially formed or carried on the steering shaft. The cylinder piston 8 and the rods 10 and 10' are, thus, axially movable in either direction with respect to the cylinder housing 7 and accordingly to the vehicle body structure. On the other hand, the steering pressure control valve 3 has a fluid inlet port communicating with the delivery port of the steering pressure pump 1 through the fluid feed passageway 6 and a fluid discharge port communicating with the fluid reservoir 4 through a fluid return passageway 11. The steering pressure control valve 3 further has first and second fluid outlet ports communicating with the first and second fluid chambers 9 and 9' of the steering power cylinder 2 through first and second control fluid passageways 12 and 12', respectively. The pressure control valve 3 further comprises a valve member (not shown) engaged with the steering shaft and is actuated to move as the steering shaft is caused to turn about the center axis thereof. A driver's manual steering effort applied to the steering wheel is transmitted through the steering shaft and the pinion gear thereon to the rack portion of the rod 10 or 10' and further through the piston 8, rods 10 and 10' and tie rods to the wheel axles of the front road wheels and cause the front road wheels to veer. The manual steering effort transmitted to the cylinder piston 8 is boosted by a fluid pressure directed through the steering pressure control valve 3 to one of the first and second fluid chambers 9 and 9' of the power cylinder 2 from the pump 1.

The fluid under pressure supplied from the steering pressure pump 1 to the pressure control valve 3 through the fluid feed passageway 6 is directed at different rates to the first and second fluid chambers of the steering power cylinder 2 through the first or second control fluid passageway 12 or 12' depending upon the direction in which the steering wheel is turned by a driver's manual steering effort applied thereto. The fluid pressures thus developed in the first and second fluid chambers, respectively, act on the cylinder piston 8 and urge the piston to axially move with respect to the cylinder housing 7 in a direction in which the piston 8 is urged to move by the higher fluid pressure. The cylinder piston 8 is, accordingly, caused to axially move with respect to the cylinder housing 7 by the driver's manual steering effort transmitted through the steering shaft to the piston 8 and the force resulting from the differential fluid pressure acting on the piston 8. The flow rate of the fluid thus passed through the pressure control valve 3 to the steering power cylinder 2 and accordingly the differential pressure exerted on the cylinder piston 8 are varied depending upon the angle through which the steering wheel is manually turned by the vehicle driver. The degree of hydraulic steering assistance produced in the steering system is dictated by the differential pressure to act on the cylinder piston 8 and is thus variable with the flow rate of fluid from the fluid feed passageway 6 to the steering power cylinder 2 through the pressure control valve 3 and the flow rate fluid from the pressure control valve 3 to the power cylinder 2. The fluid in the fluid chamber 9 or 9' in which the lower fluid pressure is developed is discharged through the pressure control valve 3 and the fluid return passageway 11 to the fluid reservoir 4.

The steering control apparatus embodying the present invention further comprises fluid flow control valve means 13 which bypasses the pressure control valve 3 between the fluid feed and fluid return passageways 6 and 11 and which consists largely of a series combination of a pressure reducing valve 14 and a pressure compensating valve 15. The pressure reducing valve 14 is adapted to reduce the fluid pressure to be passed to the pressure control valve 3 through the fluid feed passageway 6 at a rate which is continuously variable with vehicle speed, while the pressure compensating valve 15 is adapted to maintain constant the differential fluid pressure developed across the pressure reducing valve 14.

Figure 2:
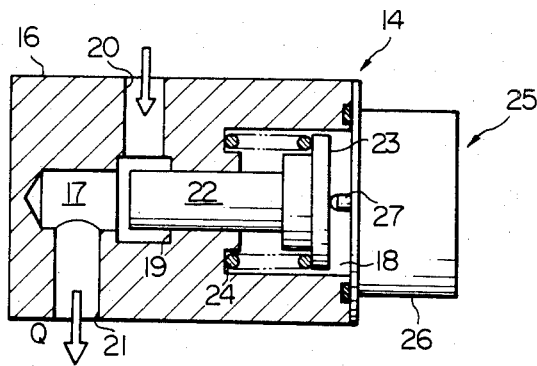
FIG. 2 is a sectional view showing the construction of a pressure reducing valve included in the steering control apparatus shown in FIG. 1.

Referring to FIG. 2, the pressure reducing valve 14 comprises a valve housing 16 formed with first and second axial cavities 17 and 18 arranged in series across an annular internal wall portion 19 of the housing 16. The valve housing 16 is further formed with fluid inlet and discharge ports 20 and 21 radially open to the first cavity 17 and slightly offset from each other axially of the first cavity 17. The fluid inlet port 20 communicates with the fluid feed passageway 6 through the pressure compensating valve 15 while the fluid discharge port 21 is open direct to the fluid return passageway 11, as will be seen from FIG. 1. The pressure reducing valve 14 further comprises a valve spool 22 projecting from the second cavity 18 into the first cavity 17 through the internal wall portion 19 and is axially movable with respect to the valve housing 16 in first and second directions to increase and decrease the degree of fluid communication between the fluid inlet and discharge ports through the first cavity 17. The valve spool 22 has an annular flange portion 23 in its axial end in the second cavity 18 as shown. The valve spool 22 is urged to move in the first direction to increase the degree of fluid communication between the fluid inlet and discharge ports 20 and 21 through the first cavity 7 by suitable biasing means. In the arrangement herein shown, the biasing means is assumed, by way of example, as comprising a preloaded helical compression spring 24 which is seated at one end on the annular internal wall portion 19 of the housing and at the other on the flange portion 23 of the valve spool 22. A solenoid-operated valve actuator 25 comprises a casing 26 fixedly attached to the valve housing 16 and a plunger 27 axially projecting into the second cavity 18 in the housing 16 and engaging the valve spool 22 at its leading end as shown. The valve actuator 25 further comprises a solenoid coil 28 (FIG. 1) coaxially surrounding a core member integral with or securely connected to the plunger 27, though not shown in FIG. 2. When the solenoid coil of the actuator 25 thus arranged is energized, the plunger 27 is caused to axially protrude deeper into the second cavity 18 and causes the valve spool 22 to axially move against the force of the compression spring 24 in the second direction to reduce the degree of fluid communication between the fluid inlet and discharge ports 20 and 21 of the valve 14. Thus, the axial position of the valve spool 22 with respect to the valve housing 16 and accordingly the degree of fluid communication between the fluid inlet and discharge ports 20 and 21 through the first cavity 17 of the valve 14 vary with the relationship among the force of the spring 24, the fluid pressure developed in the cavity 17 and acting on the valve spool 22 and the force with which the valve spool 22 is urged to move by means of the solenoid-operated valve actuator 25.

Figure 3:
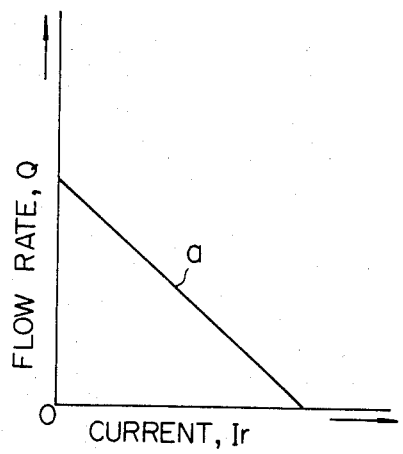
FIG. 3 is a graph showing an example of the relationship between the current supplied to the valve actuator of the pressure reducing valve shown in FIG. 2 and the flow rate of the fluid to be passed through the valve in response to the current.

The solenoid-operated valve actuator 25 is designed so that the distance of movement of the plunger 27 thereof varies substantially linearly with the current Ir supplied to the solenoid coil 28 when the valve actuator 25 is energized. Furthermore, the valve housing 16 and the valve spool 22 are designed so that the degree of fluid communication between the fluid inlet and discharge ports 20 and 21 through the cavity 17 varies linearly with the axial movement of the valve spool 22. On the other hand, the compression spring 24 is selected so that the force exerted on the valve spool 22 remains substantially constant without respect to the load imparted to the spring 24, viz., the length to which the spring 24 is compressed by the load. Thus, the relationship between the current Ir fed to the valve actuator 25 and the degree of communication between the fluid inlet and discharge ports 20 and 21 or, in other words, the flow rate of fluid Q through the cavity 17 is such that the former decreases and increases linearly as the latter increases and decreases, respectively, as indicated by plot a in FIG. 3.

When the solenoid coil 28 of the valve actuator 25 remains de-energized, the the valve spool 22 is held in an axial position providing a maximum degree of fluid communication between the fluid inlet and discharge ports 20 and 21 by the force of the spring 24. When the solenoid coil 28 is energized, the valve spool 22 is axially moved deeper into the first cavity 17, viz., in the above mentioned second direction with respect to the valve housing 16 against the force of the spring 24. As the current Ir supplied to the coil 28 increases, the valve spool 22 is caused to move deeper into the cavity 17 so that the degree of fluid communication between the fluid inlet and discharge ports 20 and 21 and accordingly the flow rate of fluid Q through the first cavity 17 decrease linearly with the increase in the current Ir as will be seen from the plot a of FIG. 3. If the current Ir supplied to the solenoid coil 28 is thereafter reduced, then the degree of fluid communication between the fluid inlet and discharge ports 20 and 21 and accordingly the flow rate of fluid Q through the cavity 17 increase linearly with the decrease in the current Ir. The solenoid coil 28 has terminals connected through a suitable driver circuit (not shown) to an output terminal of a valve control circuit 29 shown in FIG. 4.

Figure 4:
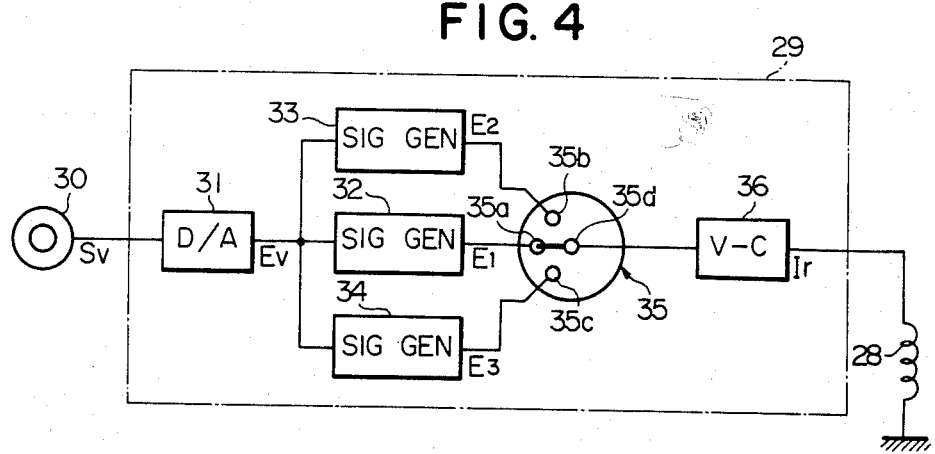
FIG. 4 is a schematic view showing a preferred form of valve control circuit for the valve actuator of the pressure reducing valve forming part of the steering control apparatus shown in FIG. 1.

Referring to FIG. 4, the valve control circuit 29 is provided in combination with parameter detecting means which is constituted, in the embodiment herein shown, by a vehicle-speed sensor 30 operative to detect driving speed of the vehicle and to produce pulse signals Sv representative of the detected vehicle speed. The valve control circuit 29 comprises a digital-to-analog converter 31 having an input terminal connected to the vehicle-speed sensor 30 and adapted to convert the output pulse signals Sv into a voltage signal Ev continuously variable with the vehicle speed represented by the pulse signals Sv. The digital-to-analog converter 31 has three output terminals respectively connected to first, second and third signal generators 32, 33 and 34 adapted to produce different output voltage signals $E_1$, $E_2$ and $E_3$, respectively, in response to the output voltage signal Ev. The signals $E_1$, $E_2$ and $E_3$ are representative of different basic modes of control in accordance with which the flow rate of fluid Q through the above described pressure reducing valve 14 and accordingly the degree of hydraulic steering assistance to be achieved by the fluid pressure directed to the steering pressure control valve 3 are to be controlled in relation to vehicle speed. These basic modes of control are graphically represented by plots $e_1$, $e_2$ and $e_3$, respectively, in FIG. 5. As will be seen from the plot $e_1$, the voltage signal $E_1$ varies in direct proportion to the input voltage signal Ev at a first predetermined rate throughout the range of interest of the voltage signal Ev. The voltage signal $E_2$ varies in direct proportion to the input voltage signal Ev at a second predetermined rate higher than the first predetermined rate when the Ev is lower than a first predetermined value $\epsilon$ and at a third predetermined rate lower than the first predetermined rate when the Ev is higher than the first predetermined value $\epsilon$, as will be seen from the plot $e_2$. On the other hand, the voltage signal $E_3$ varies in direct proportion to the input voltage signal Ev at a fourth predetermined rate lower than the first predetermined rate when the Ev is lower than a second predetermined value $\epsilon'$ and at a fifth predetermined rate higher than the first predetermined rate when the Ev is higher than the second predetermined value $\epsilon'$, as will be seen from the plot $e_3$. Preferably, the second and fifth predetermined rates are substantially equal to each other and, likewise, the third and fourth predetermined rates are substantially equal to each other, as will be seen from the plots $e_2$ and $e_3$. Each of the output signals $E_1$, $E_2$ and $E_3$ is indicative of the flow rate Q of the fluid to be passed through the pressure reducing valve 14 and accordingly of the degree of steering assistance to be achieved by the fluid pressure directed to the steering pressure control valve 3 (FIG. 1). When the degree of steering assistance to be achieved by the fluid pressure directed to the pressure control valve 3 is controlled on the basis of the voltage signal $E_1$, the degree of steering assistance varies at a fixed rate with at any vehicle speeds. When the degree of hydraulic steering assistance is controlled on the basis of the voltage signal $E_2$, the degree of steering assistance varies at a rate higher at low vehicle speeds than at high vehicle speeds so that the vehicle driver is required to apply a larger steering effort to the steering wheel at low vehicle speeds than at high vehicle speeds. When the degree of hydraulic steering assistance is controlled on the basis of the voltage signal $E_3$, the degree of steering assistance varies at a rate lower at low vehicle speeds than at high vehicle speeds so that the vehicle driver is required to apply a larger steering effort to the steering wheel at high vehicle speeds than at low vehicle speeds. These three modes of control over the hydraulic steering assistance are represented by a set of information stored in the individual signal generators 33, 34 and 35 and accessible when a voltage representative of a detected vehicle speed is applied to the signal generators. Each of such signal generators 32, 33 and 34 may be constituted by a variable-factor amplifier composed of, for example, an operational amplifier and a Schmidt circuit. The operational amplifier and the Schmidt circuit are arranged so that the Schmidt circuit is turned on when a voltage higher than a predetermined level is impressed thereon and that the operational amplifier is caused to change its amplification factor by an output signal produced by the Schmidt circuit thus turned on. Alternatively, each of the signal generators 32, 33 and 34 may be constituted by a function generator composed of a micro processor and a memory module having stored therein a set of information in digitalized form. The pieces of information stored in the memory module may be read out therefrom in response to the voltage signal Ev or, of desired, direct to the digital signal Sv supplied from the vehicle-speed sensor 30 (FIG. 4).

Figure 5:
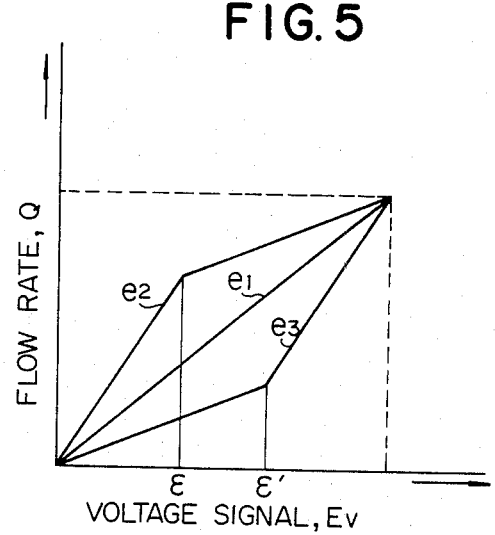
FIG. 5 is a graph showing examples of basic modes of control over the flow rate of fluid through the pressure reducing valve of the steering control apparatus shown in FIG. 1 as achieved by the valve control circuit shown in FIG. 4.

The valve control circuit 29 shown in FIG. 4 further comprises a three-position rotary switch unit 35 serving as means to select one of the basic modes of steering assistance control dictated by the plots $e_1$, $e_2$ and $e_3$ shown in FIG. 5 as above described. Such a switch unit 35 comprises first, second and third stationary contact elements 35a, 35b and 35c connected to the output terminals of the above described first, second and third signal generators 32, 33 and 34, respectively. The rotary switch unit 35 further comprises a movable contact element 35d which is angularly movable between the first, second and third stationary contact elements 35a, 35b and 35c. One of the output signals $E_1$, $E_2$ and $E_3$ is, thus, selectively passed through the switch unit 35 depending upon the angular position of the movable contact element 35d with respect to the stationary contact elements 35a, 35b and 35c. The rotary switch unit 35 is preferably located in the neighborhood of the vehicle driver's seat so as to enable the vehicle driver to select one of the above described basic modes of steering assistance control easily and at any time during driving. The voltage signal $E_1$, $E_2$ or $E_3$ passed through the rotary switch unit 35 is fed to a voltage-to-current converter 36 and is thereby converted into a current Ir continuously variable with the input voltage signal $E_1$, $E_2$ or $E_3$. The voltage-to-current converter 36 preferably has a constant-current network incorporated therein so as to be capable of delivering a current Ir accurately varying with the input voltage signal $E_1$, $E_2$ or $E_3$ without respect to a change which may be caused in the resistance of the solenoid coil 28 due to a rise in the temperature thereof. The voltage-to-current converter 36 has an output terminal connected to the solenoid coil 28 of the valve actuator 25 shown in FIG. 2 and energizes the coil 28 with the current Ir thus delivered from the valve control circuit 29. In response to the current Ir which is supplied in this fashion to the solenoid coil 28 of the valve actuator 25, the pressure reducing valve 14 permits fluid to flow from the fluid feed passageway 6 to the fluid return passageway 11 at a rate Q which varies with the current Ir in accordance with the characteristic indicated by the plot a in FIG. 3. The flow rate of the fluid to be supplied to the steering power cylinder 2 is, thus, once controlled by the signal current Ir supplied to the valve actuator 25 and is further controlled by means of the pressure control valve 3. The hydraulic steering assistance to be achieved by the fluid pressure supplied to the steering power cylinder 2 is in this manner controlled primarily by the fluid flow control valve means 13 and secondarily by the pressure control valve 3 shown in FIG. 1.

Figure 6:
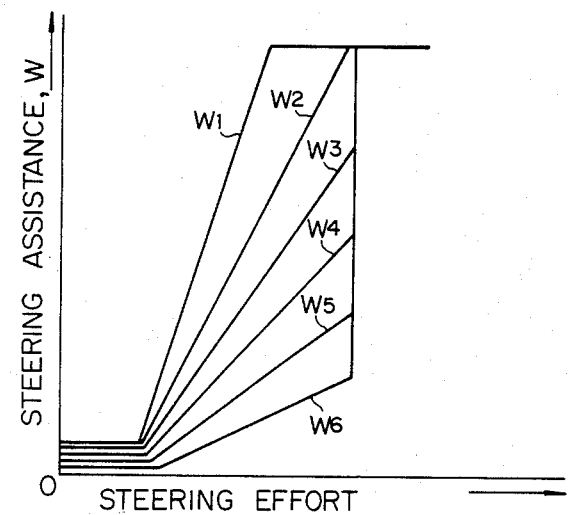
FIG. 6 is a graph showing various degrees of hydraulic steering assistance achieved responsive to a driver's manual steering effort applied to the steering wheel under the control of the pressure reducing valve of the steering control apparatus shown in FIG. 1.

When, now, the solenoid-operated valve actuator 25 is supplied with a constant current, the valve spool 22 of the pressure reducing valve 14 is held at rest in the valve housing 18 and establishes a constant degree of communication between the fluid inlet and discharge ports 20 and 21. The fluid under pressure delivered at a constant rate from the steering pressure pump 1 to the fluid feed passageway 6 is therefore permitted to pass through the pressure reducing valve 14 to the fluid return passageway 11 at a fixed rate. Under these conditions, the degree of hydraulic steering assistance W to be achieved under the control of the pressure reducing valve 14 (FIG. 1) varies linearly with a driver's manual steering effort applied to the steering wheel as indicated by plot $w_1$ in FIG. 6. If the current Ir supplied to the valve actuator 25 is then stepwise reduced with the steering wheel held at rest in a right-turn or left-turn position and with the valve member (not shown) of the steering pressure control valve 3 (FIG. 1) held in a certain position, the valve spool 22 of the pressure reducing valve 14 is caused to stepwise move in the direction to increase the degree of communication between the fluid inlet and discharge ports 20 and 21 of the pressure reducing valve 14. It therefore follows that the flow rate Q of the fluid passed from the fluid feed passageway 6 to the fluid return passageway 11 through the pressure reducing valve 14 stepwise increases and as a consequence the fluid pressure directed through the pressure control valve 3 to the power cylinder 2 is stepwise reduced as the current Ir supplied to the valve actuator 25 decreases. Thus, the degree of hydraulic steering assistance W controlled by the pressure reducing valve 14 (FIG. 1) decreases stepwise with respect to the driver's manual steering effort applied to the steering wheel as indicated by plots $w_2, w_3, \ldots w_6$ in FIG. 6 as the current Ir supplied to the valve actuator 25 is stepwise reduced. The vehicle driver is for this reason required to apply increasing manual steering efforts to the steering wheel as the current Ir supplied to the valve actuator 25 is reduced. If the rotary switch unit 35 of the valve control circuit 29 shown in FIG. 4 is held in a condition providing connection between the first stationary contact element 35a and the movable contact element 35d as shown, the manual steering effort which the vehicle driver is required to apply to the steering wheel increases linearly at a constant as the vehicle speed increases, as will be seen from the plot $e_1$ in FIG. 5. If, on the other hand, the rotary switch unit 35 is held in a condition providing connection between the second stationary contact element 35b and the movable contact element 35d, the vehicle driver is required to apply relatively large manual steering efforts at relatively low vehicle speeds and relatively small manual steering efforts at relatively high vehicle speeds as will be seen from the plot $e_2$ in FIG. 5. If, furthermore, the rotary switch unit 35 is held in a condition providing connection between the third stationary contact element 35c and the movable contact element 35d, the vehicle driver is required to apply relatively small manual steering efforts at relatively low vehicle speeds and relatively large manual steering efforts at relatively high vehicle speeds as will be seen from the plot $e_3$ in FIG. 5. The steering assistance to be achieved by the fluid pressure supplied to the steering pressure control valve 3 is in these manners controlled in three different basic modes depending upon the angular position of the movable contact element 35d of the rotary switch unit 35.

Figure 7:
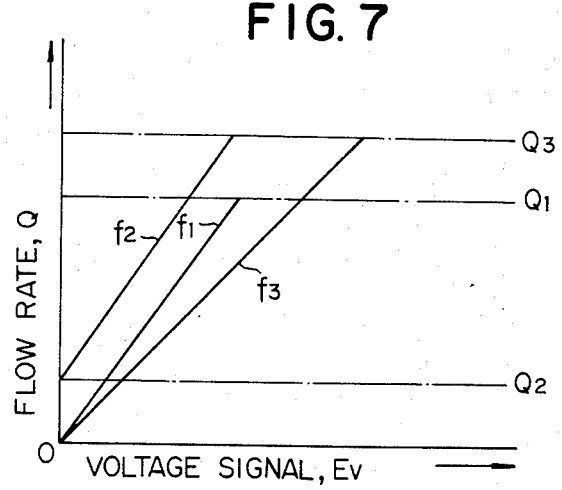
FIG. 7 is a graph showing other examples of basic modes of control over the flow rate of fluid through the pressure reducing valve of the steering control apparatus shown in FIG. 1 as achieved by the valve control circuit shown in FIG. 4.

The basic modes of control over the steering assistance to be achieved by the fluid pressure directed to the steering pressure control valve 3 as hereinbefore described are merely by way of example and may thus be modified in numerous manners. FIG. 7 shows examples of such modified basic modes of control over the hydraulic steering assistance. These modified basic modes of control are also shown in terms of the flow rate of fluid Q through the pressure reducing valve 14 illustrated in FIG. 2 and are assumed to be represented by a set of information stored in signal generators having output terminals respectively connected to the three stationary contact elements 35a, 35b and 35c of the three-position rotary switch unit 35 shown in FIG. 4. More specifically, the modified basic mode of control represented by plot $f_1$ in FIG. 7 is represented by a set of information stored in the first signal generator 32 and is such that the flow rate of fluid Q through the pressure reducing valve 14 varies at a relatively high first predetermined rate between zero and a first predetermined value $Q_1$ in direct proportion to the voltage signal Ev supplied to the signal generator 32. When the basic mode of steering assistance control represented by plot $f_1$ is selected, the vehicle driver is thus required to apply a relatively large manual steering effort to the steering wheel until the steering effort reaches a value corresponding the first predetermined value $Q_1$ of the fluid flow rate Q. The modified basic mode of steering assistance control represented by plot $f_2$ in FIG. 7 is represented by a set of information stored in the second signal generator 33 and is such that the flow rate of fluid Q through the pressure reducing valve 14 varies linearly at a relatively high second predetermined rate between second and third predetermined values $Q_2$ and $Q_3$ in response to the voltage signal Ev supplied to the signal generator 33. The second and third predetermined values $Q_2$ and $Q_3$ are respectively smaller and larger than the first predetermined value $Q_1$ and the second predetermined rate of change of the fluid flow rate may be substantially equal to the first predetermined rate. When the basic mode of steering assistance control represented by the plot $f_2$ is selected, the vehicle driver is thus required to apply a larger manual steering effort to the steering wheel until the steering effort reaches a value corresponding the third predetermined value $Q_3$ of the fluid flow rate Q. On the other hand, the modified basic mode of steering assistance control represented by plot $f_3$ in FIG. 7 is represented by a set of information stored in the third signal generator 34 and is such that the flow rate of fluid Q through the pressure reducing valve 14 linearly varies at a relatively low third predetermined rate between zero and the third predetermined value $Q_3$ in response to the voltage signal Ev supplied to the signal generator 34. The third predetermined rate of change of the fluid flow rate Q is lower than each of the first and second predetermined rates of change of the fluid flow rate Q. When the basic mode of steering assistance control represented by the plot $f_3$ is selected, the vehicle driver is therefore permitted to apply a relatively small manual steering effort to the steering wheel until the steering effort reaches a value corresponding the third predetermined value $Q_3$ of the fluid flow rate Q. The flow rate of the fluid to be supplied to the steering power cylinder 2 and accordingly the degree of hydraulic steering assistance to be achieved by the vehicle steering system are thus controlled primarily by the pressure reducing valve 14 as described above and are further controlled by means of the pressure control valve 3 shown in FIG. 1.

While it has been assumed that the rotary switch unit 35 is of the three position type, this is simply by way of example and, therefore, the rotary switch unit provided in the steering control apparatus of a vehicle steering system according to the present invention may comprise two or more than three stationary contact elements respectively connected to signal generators. In this instance, the valve control circuit of the steering control apparatus may comprise two or more than three signal generators respectively connected to these stationary contact elements of the rotary switch unit and may have stored therein a set of information representative of desired basic modes of control over the hydraulic steering assistance to be achieved by the fluid pressure supplied to the steering pressure control valve 3 as will be readily understood from the foregoing description.

Figure 8:
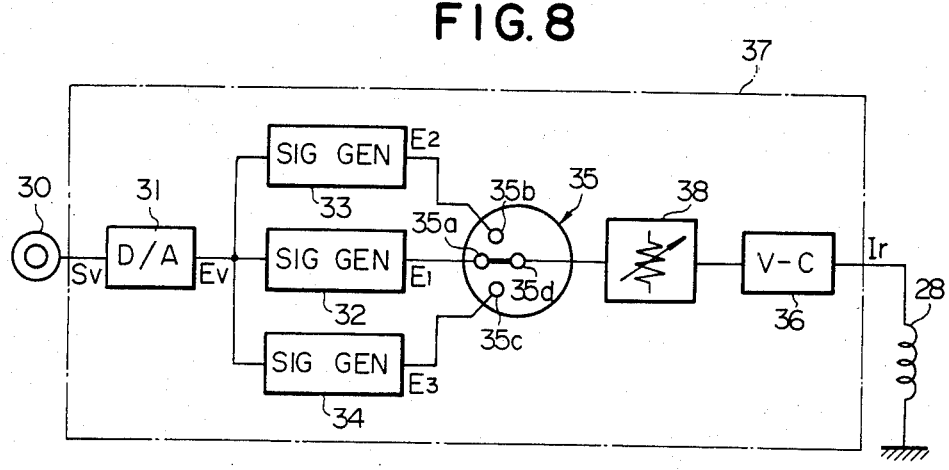
FIG. 8 is a view similar to FIG. 4 but shows another preferred form of valve control circuit for the valve actuator of the pressure reducing valve forming part of the steering control apparatus shown in FIG. 1.
Figure 9:
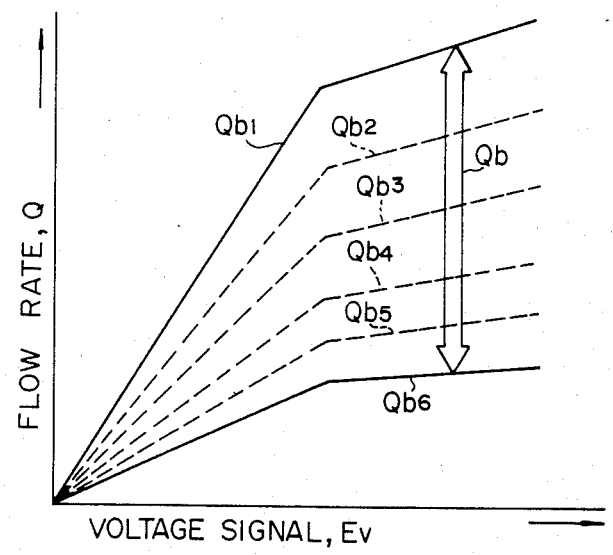
FIG. 9 is a view showing examples of basic modes of control over the flow rate of fluid through the pressure reducing valve of the steering control apparatus shown in FIG. 1 as achieved by the valve control circuit shown in FIG. 8.

FIG. 8 shows a modification of the valve control circuit 29 described with reference to FIG. 4. The valve control circuit, now designated in its entirety by reference numeral 37, comprises a variable-factor amplifier 38 in addition to the component units of the valve control circuit 29 shown in FIG. 4. The variable-factor amplifier 37 has an input terminal connected to the movable contact element 35d of the three-position rotary switch unit 35 and an output terminal connected to the voltage-to-current converter 45. Though not shown in the drawings, the variable-factor amplifier 38 has its feedback resistor replaced by a variable resistor and has an amplification factor which is continuously variable with the resistance value of the resistor. The variable-factor amplifier 38 is thus constructed and arranged so that the flow rate of fluid Q though the pressure reducing valve 14 is variable with the detected vehicle speed at a rate which is continuously variable with the resistance value of the feedback resistor forming part of the amplifier 38. If the detected vehicle speed is denoted by V, then the flow rate of fluid Q through the pressure reducing valve 14 is given by the equation $Q = k \cdot V$ where k is a parameter continuously variable with the amplification factor of the amplifier 38. If the basic mode of steering assistance control indicated by the plot $e_2$ in FIG. 5 is selected with the rotary switch 35 held in a condition having the movable contact element 35d connected to the second stationary contact element 35b, the flow rate of fluid Q through the pressure reducing valve 14 will be varied continuously in a range Qb between certain values indicated by plots $Q_{b1}$ and $Q_{b6}$ through values $Q_{b2}$, $Q_{b3}$, $Q_{b4}$ and $Q_{b5}$ as indicated in FIG. 9 when the amplification factor of the variable-factor amplifier 38 is varied, for example, from 1.0 to 0.0 through 0.8, 0.6, 0.4 and 0.2, respectively.

Figure 10:
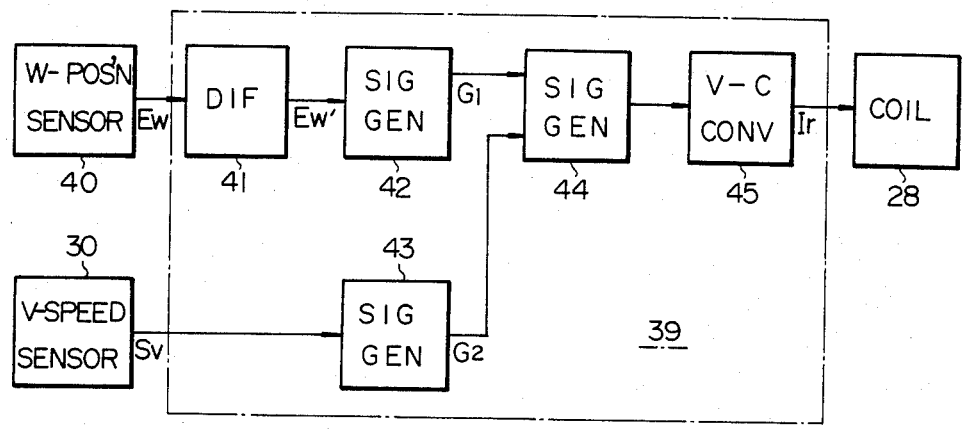
FIG. 10 is a block diagram showing still another preferred form of valve control circuit for the valve actuator of the pressure reducing valve forming part of the steering control apparatus shown in FIG. 1.
Figure 11:
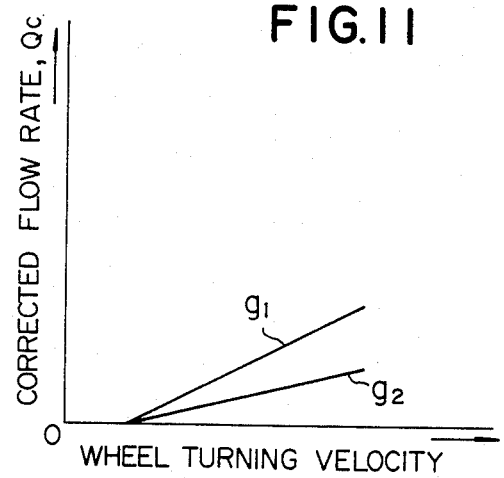
FIG. 11 is a view showing examples of basic modes of control over the flow rate of fluid through the pressure reducing valve of the steering control apparatus shown in FIG. 1 as achieved by the valve control circuit shown in FIG. 10.

FIG. 10 shows another preferred example of the valve control circuit of the steering control apparatus of a vehicle steering system according to the present invention. The valve control circuit, now designated in its entirety by reference numeral 39, is provided in combination with parameter detecting means which is constituted, in the embodiment herein shown, by steering velocity detecting means and a vehicle-speed sensor 30 similar to its counterpart in the valve control circuit 29 shown in FIG. 4. The steering velocity detecting means comprises a wheel-position sensor 38 and a differentiator 41. The wheel-position sensor 38 is constituted by, for example, a potentiometer arranged in conjunction with the steering wheel or shaft (not shown) and is operative to detect an angle of turn of the steering wheel about the center axis thereof and to produce an output voltage signal Ew representative of the detected angle of turn of the steering wheel. The differentiator 41 has an input terminal connected to the wheel-position sensor 38 and is operative to differentiate the input voltage signal Ew with respect to time and to produce an output voltage signal Ew' representative of an angular velocity of turn of the steering wheel. The valve control circuit 39 is responsive to the output signals Sv and Ew' and comprises first, second and third signal generators 42, 43 and 44, and a voltage-to-current converter 45 as shown. The first signal generator 42 has an input terminal connected to the output terminal of the differentiator 41 and is operative to calculate the flow rate of fluid Q to be passed through the pressure reducing valve 14 to achieve a maximum desired volumetric increment of the fluid to be admitted through the pressure control valve 3 into the fluid chamber 9 or 9' of the steering power cylinder 2 (FIG. 1) when the steering wheel is being turned at the angular velocity represented by the signal Ew'. The first signal generator 42 produces an output voltage signal $G_1$ representative of the flow rate of fluid Q thus calculated. The signal generator 42 to achieve such a function may be constructed and arranged in such a manner that the voltage signal Ew' thereby produced is representative of a fluid flow rate Q which varies with the angular turning velocity of the steering wheel either in a first predetermined relationship indicated by plot $g_1$ or in a second predetermined relationship indicated by plot $g_2$ in FIG. 11. On the other hand, the second signal generator 43 is supplied with the digital output signal Sv and is operative to calculate a desired flow rate of fluid Q through the pressure reducing valve 14 for the vehicle speed represented by the input signal Sv and to produce an output voltage signal $G_2$ representative of the desired flow rate of fluid thus calculated. The second signal generator 43 to achieve such a function may be constructed and arranged so that the output signal $G_1$ thereby produced is representative of a basic mode of steering assistance control similar to any one of the basic modes of control represented by the plots $f_1$, $f_2$ and $f_3$ shown in FIG. 7. The first and second signal generators 42 and 43 have output terminals jointly connected to the third signal generator 44, which is operative to add the respective output signals $G_1$ and $G_2$ to each other and to produce an output voltage signal Eg representative of the sum of the fluid flow rates respectively represented by the signals $G_1$ and $G_2$. The voltage signal Eg is fed to the voltage-to-current converter 45 and is thereby converted into a current Ir continuously variable with the input voltage signal Eg. The voltage-to-current converter 45 has an output terminal connected to the solenoid coil 28 of the valve actuator 25 shown in FIG. 2 and energizes the coil 28 with the current Ir thus delivered from the valve control circuit 39. Each of the first, second and third signal generators 42, 43 and 44 may be constituted by an operational amplifier.

When, now, the steering wheel is turned by a driver's manual steering effort applied thereto, the differentiator 41 of the valve control circuit 39 constructed as described above differentiates the output voltage signal Ew with respect to time and produces an output voltage signal Ew' representative of the angular velocity of turn of the steering wheel. In response to the signal Ew', the first signal generator 42 calculates the flow rate of fluid Q to be passed through the pressure reducing valve 14 to achieve a maximum desired volumetric increment of the fluid to be admitted through the pressure control valve 3 into the fluid chamber 9 or 9' of the steering power cylinder 2 (FIG. 1). The first signal generator 42 thus produces an output voltage signal $G_1$ representative of the flow rate of fluid Qc which varies with the angular turning velocity of the steering wheel either in the predetermined relationship indicated by the plot $g_1$ or in the predetermined relationship indicated by the plot $g_2$ in FIG. 11. On the other hand, the second signal generator 43 is supplied with the digital output signal Sv and calculates a desired flow rate of fluid through the pressure reducing valve 14 for the vehicle speed represented by the input signal Sv and produces an output voltage signal $G_2$ representative of the desired flow rate of fluid thus calculated, viz., a basic mode of steering assistance control similar to any one of the basic modes of control represented by the plots $f_1$, $f_2$ and $f_3$ shown in FIG. 7. Supplied with the signals $G_1$ and $G_2$ thus delivered from the first and second signal generators 42 and 43, the third signal generator 44 produces an output voltage signal Eg representative of the sum of the fluid flow rates respectively represented by the two input signals $G_1$ and $G_2$. The voltage signal Eg is fed to the voltage-to-current converter 45 and is thereby converted into a current Ir continuously variable with the input voltage signal Eg. The current Ir is fed to the solenoid coil 28 of the valve actuator 25 shown in FIG. 2 so that the fluid under pressure supplied from the steering pressure pump 1 to the fluid feed passageway 6 is permitted to flow through the pressure reducing valve 14 to the fluid return passageway 11 at a rate Q which varies with the current Ir in accordance with the characteristic indicated by the plot a in FIG. 3 as previously noted. Fluid under pressure is thus passed through the fluid feed passageway 6 to the steering pressure control valve 3 at a rate which increases as the angular turning velocity of the steering wheel is increased. If the steering wheel is turned at a relatively high velocity at a relatively high vehicle speed, the fluid under pressure is supplied to the pressure control valve 3 at a rate which is controlled in such a manner as to produce a proper increment in the fluid chamber 9 or 9' of the steering steering pressure pump 1 and which thus assures the vehicle driver to steer the vehicle with a proper manual steering effort.

Figure 12:
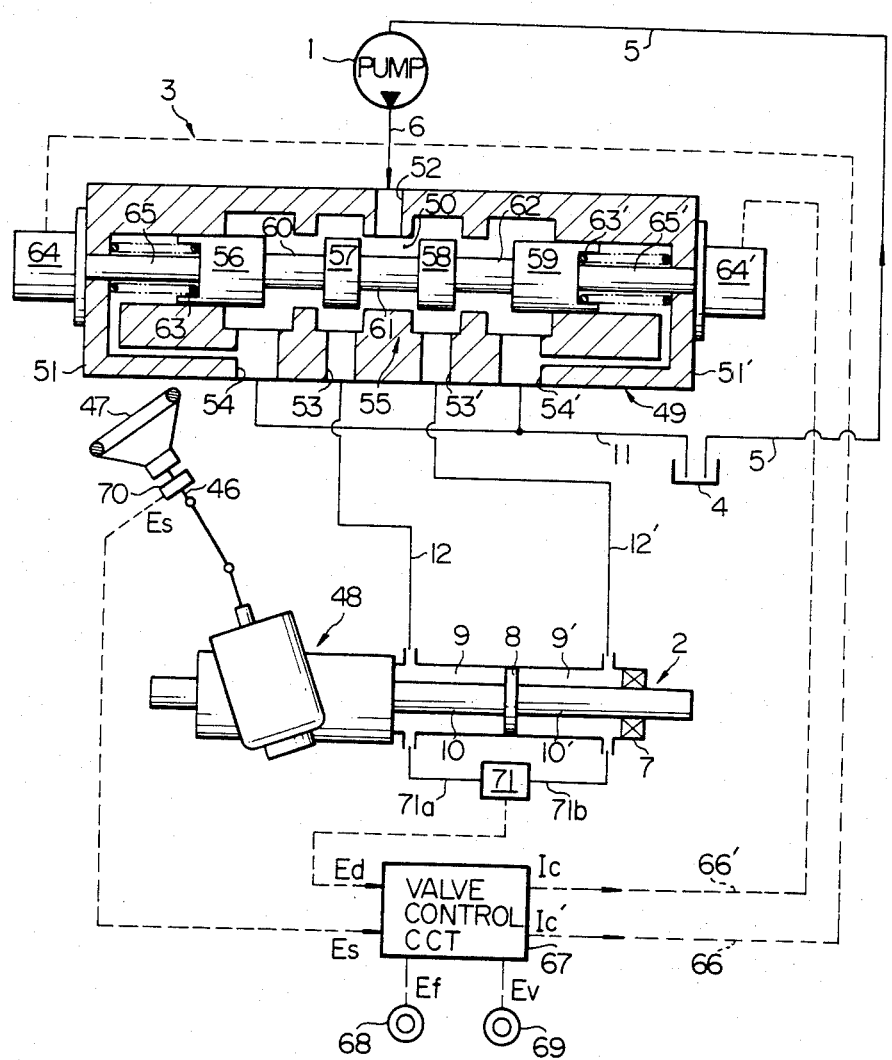
FIG. 12 is a schematic view showing the basic, overall construction and arrangement of another preferred embodiment of a fluid-operated steering control apparatus according to the present invention and depicting the construction of the steering pressure control valve forming part of the control apparatus.

FIG. 12 shows a preferred example of the steering pressure control valve 3 forming part of the steering control apparatus embodying the present invention as hereinbefore described. In FIG. 12, the power-assisted vehicle steering system is shown comprising a steering wheel and shaft assembly which includes a steering shaft 46 carrying a steering wheel 47 at its upper end and axially extending through a hollow steering column tube (not shown). The steering system is further shown comprising a steering gear assembly 48 which is herein assumed to be of the rack-and-pinion type. Thus, the steering gear assembly 48 has included therein a pinion gear coaxially rotatable with the steering shaft 46 and a toothed rack which is connected to or integral with one of the rods 10 and 10' extending in opposite directions from the cylinder piston 8 of the steering power cylinder 2, though not shown in the drawings. When a driver's manual steering effort is applied to the steering wheel 47 to cause the vehicle to turn a curve, the pinion gear on the steering shaft 46 is driven to turn about the center axis of the shaft 46 and causes the rack to move in either direction with respect to the housing of the steering gear assembly 48. The movement of the rack is transmitted to the wheel axles of front road wheels, respectively, which are accordingly driven to turn about the center axes of the king pins. In response to the turning motion of the steering shaft 46, the steering pressure control valve 3 directs fluid under pressure from the fluid feed passageway 6 into one of the fluid chambers 9 and 9' of the power cylinder 2 and out of the other of the fluid chambers 9 and 9' depending upon the direction in which the steering wheel 47 is turned. The rack is urged to move in either direction by the fluid pressure developed in one of the fluid chambers 9 and 9' and acting on the cylinder piston 8. The driver's steering effort applied to the steering wheel 47 is in this fashion assisted by the fluid pressure exerted on the rack by means of the steering power cylinder 2. When the steering wheel 47 is held in or is allowed to turn to the straight-ahead position, fluid under pressure is discharged from or directed into both of the fluid chambers fluid chambers 9 and 9' of the power cylinder 2 so that the piston 8 is held in or moved to a neutral position.

The steering pressure control valve 3 comprises a valve housing 49 formed with an axial cavity 50 elongated between opposite end wall portions 51 and 51' of the valve housing 49 and further with a fluid inlet port 52, first and second fluid outlet ports 53 and 53' and first and second fluid discharge ports 54 and 54'. A valve spool 55 having first, second, third and fourth circumferential lands 56, 57, 58 and 59 is axially slidable through the cavity 50. The first, second, third and fourth lands 56, 57, 58 and 59 are axially spaced apart from each other and thus form a first groove 60 between the first and second lands 56 and 57, a second groove 61 between the second and third lands 57 and 58, and a third groove 62 between the third and fourth lands 58 and 59. The first and fourth lands 56 and 59 are formed at the opposite ends of the valve spool 55. The fluid inlet port 52 communicates with the delivery port of the steering pressure pump 1 through the fluid feed passageway 6, while the first and second fluid discharge ports 54 and 54' communicate with the reservoir 4 through a fluid return passageway 11. The first and second fluid outlet ports 53 and 53' communicate with the first and second fluid chambers 9 and 9', respectively, of the steering power cylinder 2 through the control fluid passageways 12 and 12', respectively. The valve spool 55 is axially movable in a first direction, viz., leftwardly toward one end wall portion 51 of the valve housing 49 and in a second direction, viz., rightwardly toward the end wall portion 51' of the valve housing 49.

The valve spool 55 is urged to stay in an equilibrium or neutral position in the cavity 50 by suitable biasing or centering means. In the arrangement shown in FIG. 12, such biasing or centering means is shown comprising a first preloaded helical compression spring 63 seated between the outer end face of the first land 56 of the spool 55 and the inner end face of the end wall portion 51 of the valve housing 49 and a second preloaded helical compression spring 63' seated between the outer end face of the fourth land 59 of the spool 55 and the inner end face of the end wall portion 51' of the valve housing 49. The valve spool 55 is driven to move in opposite directions from the neutral position thereof selectively by means of first and second solenoid-operated valve actuators 64 and 64' mounted on the end wall portions 51 and 51', respectively, of the valve housing 50. The first valve actuator 64 comprises a plunger 65 axially projecting into the cavity 50 through one end wall portion 51 of the valve housing 49 and connected at its leading end to the first land 56 of the valve spool 55. Likewise, the second valve actuator 64' comprises a plunger 65' axially projecting into the cavity 50 through the other end wall portion 51' of the valve housing 49 and connected at its leading end to the fourth land 59 of the valve spool 55. The plunger 65 or 65' of each of the valve actuators 64 and 64' is caused to axially retract against the force of the spring 63 or 63', respectively, when the actuator 64 or 64' is energized with a current.

When both of the first and second valve actuators 64 and 64' are kept de-energized, the valve spool 55 is maintained in the neutral position thereof in the valve housing 50 by the forces of the springs 63 and 63'. Under these conditions, fluid communication is established from the fluid inlet port 52 to both of the first and second fluid outlet ports 53 and 53' through the groove 61 between the second and third lands 57 and 58 of the value spool 55 and, through the groove 60 between the first and second lands 56 and 57 and the groove 62 between the fourth and fifth lands 58 and 59, further to the first and second fluid discharge ports 54 and 54'. When the valve spool 55 is moved in the first direction toward one end wall portion 51 of the valve housing 50, viz., leftwardly in FIG. 12 from the neutral position thereof with the first solenoid-operated valve actuator 64 energized, the degree of communication between the fluid inlet port 52 and the first fluid outlet port 53 increases and the degree of communication between the fluid inlet port 52 and the second fluid outlet port 53' decreases. The fluid delivered from the steering pressure pump 1 to the fluid feed passageway 6 is thus permitted to pass at an increasing rate to the first control passageway 12 through the first outlet port 53 and at a decreasing rate to the second control fluid passageway 12' through the second outlet port 53' as the valve spool 55 is moved closer to the end wall portion 51 of the valve housing 50. While the flow rates of fluid from the passageway 6 to the first and second control fluid passageways 12 and 12' are being increased and decreased, respectively, the flow rates of fluid from the passageway 6 to the fluid return passageway 11 through the first and second fluid discharge ports 54 and 54' of the valve 3 are reduced by the second and fifth lands 57 and 59, respectively, of the valve spool 55. The valve spool 55 is moved leftwardly in FIG. 12 until finally the communication between the fluid inlet port 52 and the first fluid discharge port 54 is blocked by the second land 57 and the communication between the fluid inlet port 52 and each of the second fluid outlet and discharge ports 53' and 54' is blocked by the third land 58 of the spool 55. The fluid passed to the first control fluid passageway 12 at an increasing rate enters the first fluid chamber 9 and the fluid passed to the second control fluid passageway 12' is recirculated through the second fluid chamber 9' of the power cylinder 2 and the fluid return passageway 11. The piston 8 of the power cylinder 2 is accordingly forced to move in the cylinder housing 7 in a direction to cause the first fluid chamber 9 to expand and the second fluid chamber 9' to contract.

When the valve spool 55 is moved in the second direction toward the other end wall portion 51' of the valve housing 50, viz., rightwardly in FIG. 12 from the neutral position thereof with the second solenoid-operated valve actuator 64' energized, the degree of communication between the fluid inlet port 52 and the first fluid outlet port 53 decreases and the degree of communication between the fluid inlet port 52 and the second fluid outlet port 53' increases. The fluid delivered from the steering pressure pump 1 to the fluid feed passageway 6 is thus permitted to pass at a decreasing rate to the first control passageway 12 through the first outlet port 53 and at an increasing rate to the second control fluid passageway 12' through the second outlet port 53' as the valve spool 55 is moved closer to the end wall portion 51' of the valve housing 50. While the flow rates of fluid from the fluid feed passageway 6 to the first and second control fluid passageways 12 and 12' are being decreased and increased, respectively, the flow rates of fluid through the first and second fluid discharge ports 54 and 54' to the fluid return passageway 11 are reduced by the first and third lands 56 and 58, respectively, of the valve spool 55. The valve spool 55 is moved rightwardly in FIG. 12 until finally the communication between the fluid inlet port 52 and each of the first fluid outlet and discharge ports 53 and 54 is blocked by the first land 57 and the communication between the fluid inlet port 52 and the second fluid discharge port 54 is blocked by the third land 58 of the spool 55. The fluid passed to the second control fluid passageway 12' at an increasing rate enters the second fluid chamber 9' and the fluid passed to the first control fluid passageway 12 is recirculated through the first fluid chamber 9 of the power cylinder 2 and the fluid return passageway 11. The piston 8 of the power cylinder 2 is accordingly forced to longitudinally move in the cylinder housing 7 in a direction to cause the second fluid chamber 9' to expand and the first fluid chamber 9 to contract.

Figure 13:
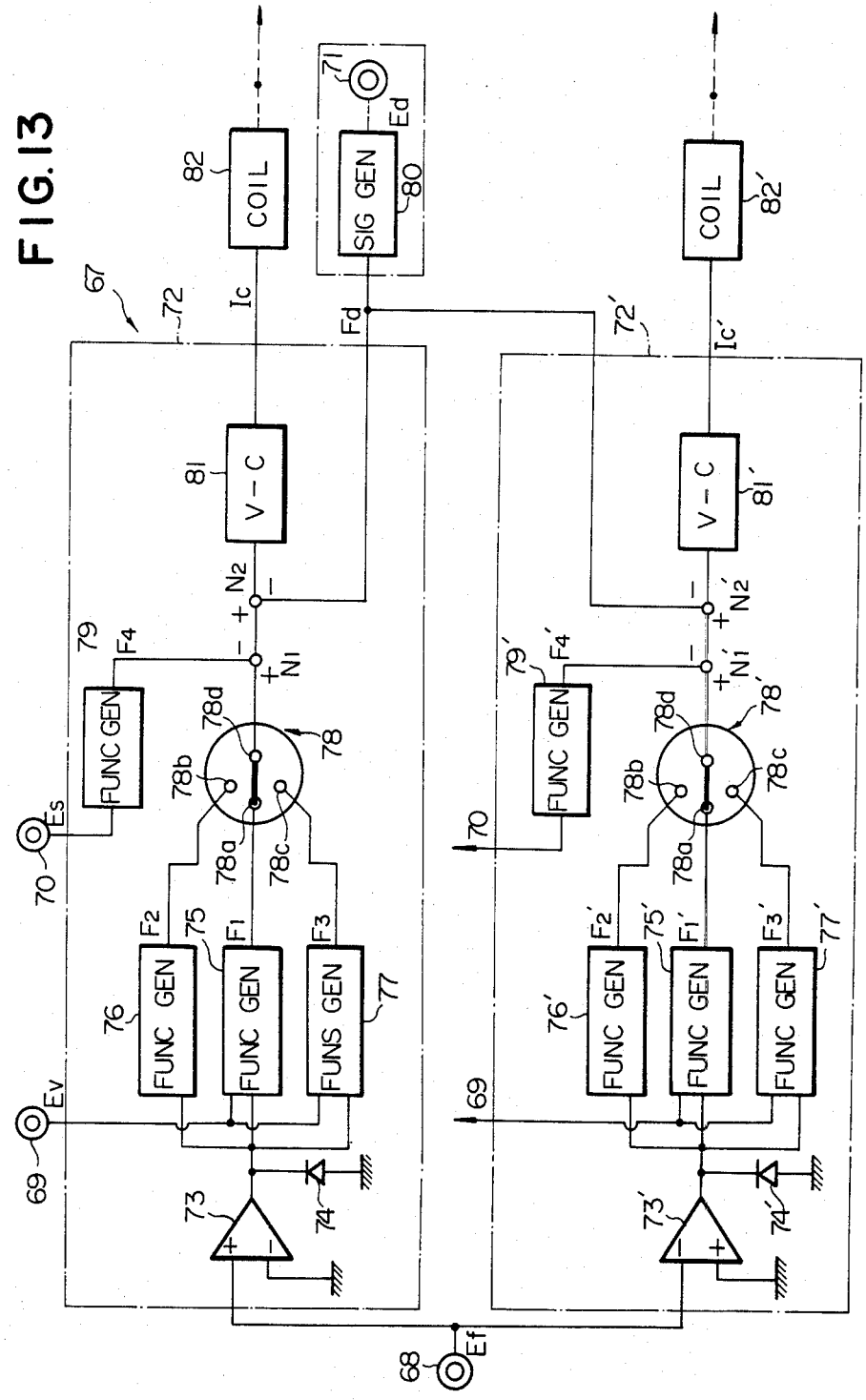
FIG. 13 is a block diagram showing a preferred form of valve control circuit for the valve actuators of the steering pressure control valve forming part of the steering control apparatus shown in FIG. 12.

The first and second solenoid-operated valve actuators 64 and 64' have incorporated therein solenoid coils (not shown) which are electrically connected through lines 66 and 66' to the output terminals of a control circuit 67. As shown in FIG. 13, the control circuit 67 has four signal input terminals connected to parameter detecting means which comprise a steering-effort sensor 68, a vehicle-speed sensor 69, a steering-velocity sensor 70 and a differential-pressure sensor 71. The steering-effort sensor 68 is provided in conjunction with the steering wheel and shaft assembly and is operative to detect a driver's manual steering effort applied to the steering wheel 47 and to produce an output voltage signal Ef representative of the detected manual steering effort. Such a steering-effort sensor 68 may be constituted by a power generator adapted to produce a positive voltage variable with the torque manually applied to the steering wheel 47 when the steering wheel 47 is turned in a left-turn direction from the neutral or straight-ahead position thereof and a negative voltage variable with the torque applied to the steering wheel 47 when the steering wheel 47 is turned in a right-turn direction from the neutral or straight-ahead position thereof. On the other hand, the vehicle-speed sensor 69 is adapted to detect driving speed of the vehicle and to produce an output voltage signal Ev representative of the detected vehicle speed, similarly to the steering-effort sensor 68 provided in each of the control circuits 29, 37 and 39 shown in FIGS. 4, 8 and 10. The steering-velocity sensor 70 is also provided in conjunction with, for example, the steering wheel and shaft assembly and is adapted to detect the angular velocity of turn of the steering wheel 47 and to produce an output voltage signal Es representative of the detected turning velocity of the steering wheel 47. Furthermore, the differential-pressure sensor 71 is operative to detect the difference between the fluid pressures developed in the first and second fluid chambers 9 and 9' of the valve 3 and to produce an output signal Ed representative of the detected differential fluid pressure therebetween. The differential-pressure sensor 71 may be provided between fluid passageways 71a and 71b respectively communicating with the first and second fluid chambers 9 and 9' of the steering pressure control valve 3 as shown in FIG. 12 or, if desired, between the first and second control fluid passageways 12 and 12'.

Figure 14:
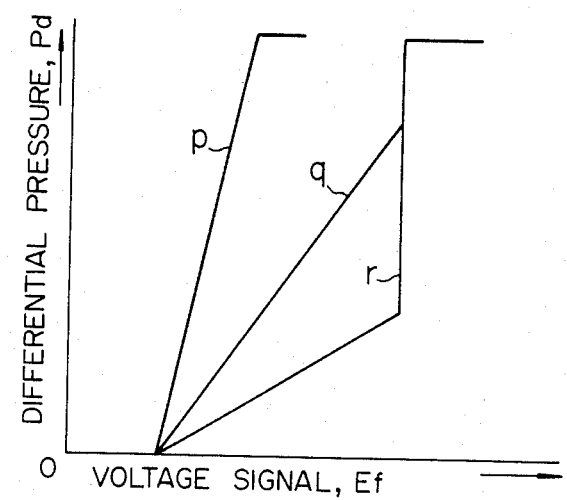
FIG. 14 is a graph showing examples of basic modes of control over the differential pressure to be developed in the steering power cylinder forming part of the steering control apparatus shown in FIG. 12 as achieved by the valve control circuit illustrated in FIG. 13.

The valve control circuit 67 thus provided in combination with the sensors 68, 69, 70 and 71 largely consists of first and second steering pressure control networks 72 and 72'. The first and second steering pressure control networks 72 and 72' are adapted to control the left-turn and right-turn steering assistance fluid pressures, respectively, and are constructed similarly to each other. The first or left-turn steering pressure control network 72 comprises a buffer amplifier 73 having a positive-polarity input terminal connected to the steering-effort sensor 68 and a negative-polarity input terminal connected to ground. The buffer amplifier 73 further has an output terminal connected to ground through a diode 74 having its cathode terminal connected to the output terminal of the buffer amplifier 73 and its anode terminal grounded. The diode 74 is provided to pass the voltage signal Ef to ground therethrough when the steering wheel 47 once turned in a left-turn direction from the straight-ahead position thereof is being turned back toward the straight-ahead position so that the voltage signal Ef has a negative polarity at the output terminal of the buffer amplifier 73. The left-turn steering pressure control network 72 further comprises first, second and third function generators 75, 76 and 77 having input terminals jointly connected to the steering-effort sensor 68 through the buffer amplifier 73. The second function generator 76 has stored therein a set of information representative of such characteristic values as satisfying a predetermined relationship between, for example, manual steering efforts applied to the steering wheel 47 and target differential fluid pressures to be developed between the first and second fluid chambers 9 and 9' of the steering power cylinder 2 (FIG. 12) for the manual steering efforts. The second function generator 76 is, thus, operative to produce an output voltage signal $F_2$ representative of the target differential fluid pressure optimum for the detected manual steering effort applied to the steering wheel 47. Likewise, each of the first and third function generators 75 and 77 has stored therein a set of information representative of such characteristic values as satisfying predetermined relationships among, for example, manual steering efforts applied to the steering wheel 47, vehicle speeds and target differential fluid pressures to be developed between the first and second fluid chambers 9 and 9' of the steering power cylinder 2 for the manual steering efforts and vehicle speeds. Thus, the first and third function generators 75 and 77 further have input terminals jointly connected to the vehicle-speed sensor 69 as shown and are operative to produce output voltage signals $F_1$ and $F_3$, respectively, which are representative of the target differential fluid pressure optimum for the detected manual steering effort and the detected vehicle speed. The target differential fluid pressure represented by each of the respective voltage signals $F_1$ and $F_3$ is in these manners determined basically in accordance with a predetermined relationship between the vehicle speed represented by the voltage signal Ev and the differential fluid pressure desirable for the detected vehicle speed and is corrected on the basis of a predetermined relationship between the manual steering effort represented by the voltage signal Ef and the differential fluid pressure desirable for the detected steering effort. If the manual steering effort applied to the steering wheel 47 and represented by the voltage signal Ef is denoted by T and the vehicle speed represented by the voltage signal Ev is denoted by V, the target differential fluid pressure Pd represented by the voltage signal $F_1$ is for this reason given by the relation $Pd = f_1(T, V)$ and, similarly, the target differential fluid pressure Pd' represented by the output voltage signal $F_3$ is given by the relation $Pd' = f_3(T, V)$. FIG. 14 shows examples of the relationships between the detected manual steering effort represented by the voltage signal Ef and the target differential fluid pressures Pd which are thus determined depending upon the detected vehicle speed and corrected on the basis of the detected manual steering effort. In FIG. 14, plots p, q and r show the relationships between the detected manual steering efforts and the target differential fluid pressures at the vehicle speeds of 0 km/hr, 50 km/hr and 120 km/hr, respectively.

The voltage signals $F_1$, $F_2$ and $F_3$ are thus representative of different basic modes of steering assistance control in accordance with which the steering assistance fluid pressure to be developed in the steering power cylinder 2 (FIG. 12) is controlled in relation to the detected vehicle speed and the detected manual steering effort applied to the steering wheel 47. Each of the first, second and third function generators 75, 76 and 77 which are operative to produce such signals may be constituted by a variable-factor amplifier composed of, for example, an operational amplifier and a Schmidt circuit. The operational amplifier and the Schmidt circuit are arranged so that the Schmidt circuit is turned on when a voltage higher than a predetermined level is impressed thereon and that the operational amplifier is caused to change its amplification factor by an output terminal produced by the Schmidt circuit thus turned on. Alternatively, each of the function generators 75, 76 and 77 may be constituted by a function generator composed of, for example, a micro processor and a memory module having stored therein a set of information in digitalized form. The pieces of information stored in the memory module may be read out therefrom in response to the voltage signal Ef (in the case of the second function generator 76) or to the voltage signals Ef and Ev (in the case of each of the first and third function generators 75 and 77).

The left-turn steering pressure control network 72 shown in FIG. 14 further comprises a three-position rotary switch unit 78 serving as means to select one of the basic modes of steering assistance control thus registered in the first, second and third function generators 75, 76 and 77. Such a switch unit 78 comprises first, second and third stationary contact elements 78a, 78b and 78c connected to the output terminals of the above described first, second and third function generators 75, 76 and 77, respectively. The rotary switch unit 78 further comprises a movable contact element 78d which is angularly movable between the first, second and third stationary contact elements 78a, 78b and 78c. One of the output voltage signals $F_1$, $F_2$ and $F_3$ is, thus, selectively passed through the switch unit 78 depending upon the angular position of the movable contact element 78d with respect to the stationary contact elements 78a, 78b and 78c. The rotary switch unit 78 is preferably located in the neighborhood of the vehicle driver's seat so as to enable the vehicle driver to select one of the above described basic modes of steering assistance control easily and at any time during driving, similarly to the rotary switch unit 35 provided in the valve control circuit 29 shown in FIG. 4. The voltage signal $F_1$, $F_2$ or $F_3$ passed through the rotary switch unit 78 is modified on the basis of the voltage signal Es and the voltage signal Ed. For this purpose, the steering-velocity sensor 70 has an output terminal connected to an input terminal of a fourth function generator 79 which has stored therein a set of information representative of such characteristic values as satisfying a predetermined relationship between angular velocities of turn of the steering wheel 47 and target differential fluid pressures to be developed between the first and second fluid chambers 9 and 9' of the steering power cylinder 2 (FIG. 12) for the turning velocities of the steering wheel 47. The fourth function generator 79 is, thus, operative to produce an output voltage signal $F_4$ representative of the target differential fluid pressure optimum for the detected angular velocity of turn of the steering wheel 47. The fourth function generator 79 has an output terminal connected to the output terminal of the rotary switch unit 78 as at a first node $N_1$ so that the voltage signal $F_1$, $F_2$ or $F_3$ passed through the switch unit 78 is modified with the voltage signal $F_4$ as above described. In the arrangement herein shown, it is assumed by way of example that the voltage signal $F_1$, $F_2$ or $F_3$ is modified with the voltage signal $F_4$ in such a manner that the latter is subtracted from the former. At the first node $N_1$ is therefore produced a voltage corresponding to the difference between the voltage signal $F_1$, $F_2$ or $F_3$ and the voltage signal $F_4$, viz., a voltage $F_1-F_4$, $F_2-F_4$ or $F_3-F_4$. On the other hand, the differential-pressure sensor 71 has an output terminal connected to an input terminal of a signal generator 80 which is operative to compare the output voltage signal Ed with a target differential fluid pressure to act on the piston 8 of the power cylinder 2 shown in FIG. 12 and to produce an output voltage signal Fd representative of an amount of error between the target differential fluid pressure and the differential fluid pressure between the fluid chambers 9 and 9' of the steering power cylinder 2 (FIG. 12) as detected by the differential-pressure sensor 71. The signal generator 80 has an output terminal connected to the output terminal of the rotary switch unit 78 as at a second node $N_2$ so that the voltage signal $F_1$, $F_2$ or $F_3$ passed through the rotary switch unit 78 and modified with the voltage signal $F_4$ as above described is further modified with the voltage signal Fd. In the arrangement herein shown, it is assumed by way of example that voltage produced at the first node $N_1$ is modified with the signal Fd in such a manner that the signal Fd is subtracted from the difference between the voltage signal $F_1$, $F_2$ or $F_3$ and the voltage signal $F_4$. At the second node $N_2$ is therefore produced a voltage corresponding to the difference between the voltage $F_1-F_4$, $F_2-F_4$ or $F_3-F_4$ and the voltage signal Fd, viz., a voltage $F_1-F_4-Fd$, $F_2-F_4-Fd$ or $F_3-F_4-Fd$. The voltage signal representative of the voltage $F_1-F_4-Fd$, $F_2-F_4-Fd$ or $F_3-F_4-Fd$ is fed to a voltage-to-current converter 81 and is thereby converted into a current Ic continuously variable with the input voltage signal $F_1$, $F_2$ or $F_3$ and the voltage signals $F_4$ and Fd. The voltage-to-current converter 81 preferably has a constant-current circuit incorporated therein so as to be capable of delivering a current Ic accurately varying with the input voltage $F_1-F_4-Fd$, $F_2-F_4-Fd$ or $F_3-F_4-Fd$ without respect to a change which may be caused in the resistance of the solenoid coil 28 due to a rise in the temperature thereof. The voltage-to-current converter 81 has an output terminal connected to the solenoid coil (denoted by reference numeral 81 in FIG. 14) of the first solenoid-operated valve actuator 64 shown in FIG. 12 and energizes the coil 81 with the current Ic thus delivered from the left-turn steering pressure control network 72. The first and second nodes or junction points $N_1$ and $N_2$ as above described constitute signal combining means operative to combine the voltage signal $F_1$, $F_2$ or $F_3$ with the voltage signal $F_4$ and the resultant voltage $F_1-F_4$, $F_2-F_4$ or $F_3-F_4$ with the voltage signal Fd.

The second or right-turn steering pressure control network 72' constituting the other half of the valve control circuit 67 shown in FIG. 13 is constructed and arranged similarly to the above described first or left-turn steering pressure control network 72 except for the connection of the buffer amplifier 73'. In FIG. 13, the component elements and units of the control network 72' are for this reason designated by adding primes to the reference numerals denoting the individual component elements and units of the control network 72 for omitting detailed description thereof. In the right-turn steering pressure control network 72', the buffer amplifier 73' has its positive-polarity input terminal connected to ground and its negative-polarity input terminal connected to the steering-effort sensor 68 so that a voltage signal Ef supplied with a negative polarity from the steering-effort sensor 68 appears with a positive polarity at the output terminal of the buffer amplifier 73'.

When, now, the steering wheel 47 is being turned in, for example, a left-turn direction away from the straight-ahead position thereof, the voltage signal Ef appears with a positive polarity at the output terminal of the buffer amplifier 73 of the left-turn steering pressure control network 72. The positive voltage signal Ef thus appearing at the output terminal of the buffer amplifier 73 is fed to each of the first, second and third function generators 75, 76 and 77. The first and third function generators 75 and 76 are thus caused to produce voltage signals $F_1$ and $F_3$, respectively, at the output terminals thereof in response to the voltage signals Ef and Ev, while the second function generator 76 is caused to produce a voltage signal $F_2$ in response to the voltage signal Ef. If, under these conditions, the three-position rotary switch unit 78 is held in a condition providing connection between the first or third stationary contact element 78a or 78c and the movable contact element 78d, the voltage signal $F_1$ or $F_3$ is passed through the switch unit 78 and is modified at the first node $N_1$ with the voltage signal $F_4$. If the rotary switch unit 78 is held in a condition providing connection between the second stationary contact element 78b and the movable contact element 78d, the voltage signal $F_2$ is passed through the switch unit 78 and is also modified at the first node $N_1$ with the voltage signal $F_4$. The target differential fluid pressure determined by the first or third function generator 75 or 77 on the basis of the detected manual steering effort and the detected vehicle speed, respectively, or by the second function generator 76 on the basis of the detected manual steering effort is modified on the basis of the signal $F_4$ representative of the detected turning velocity of the steering wheel 47. At the first node $N_1$ is therefore produced a voltage corresponding to the difference between the voltage signal $F_1$, $F_2$ or $F_3$ and the voltage signal $F_4$. The voltage $F_1-F_4$, $F_2-F_4$ or $F_3-F_4$ is modified at the second node $N_2$ with the voltage signal Ed so that the differential fluid pressure represented by the voltage $F_1-F_4$, $F_2-F_4$ or $F_3-F_4$ is further modified on the basis of the differential fluid pressure between the fluid chambers 9 and 9' of the steering power cylinder 2 (FIG. 12) as detected by the differential-pressure sensor 71. If there is an error detected by the signal generator 80 to exist between the target and detected differential fluid pressures, the target differential fluid pressure represented by the voltage produced at the first node $N_1$ is modified in such a manner as to reduce the amount of error represented by the voltage signal Fd. At the second node $N_2$ is therefore produced a voltage corresponding to the difference between the voltage $F_1-F_4$, $F_2-F_4$ or $F_3-F_4$ and the voltage signal Fd. The voltage $F_1-F_4-Fd$, $F_2-F_4-Fd$ or $F_3-F_4-Fd$ is fed to the voltage-to-current converter 81 and is thereby converted into a current Ic continuously variable with the input voltage signal $F_1$, $F_2$ or $F_3$ and the voltage signals Es and Ed. The current Ic is fed to the solenoid coil 82 of the first solenoid-operated valve actuator 64 of the steering pressure control valve 3 shown in FIG. 12. The coil 81 of the first solenoid-operated valve actuator 64 being energized with the current Ic thus delivered from the left-turn steering pressure control network 72, the valve spool 55 of the pressure control valve 3 is moved from the neutral position thereof in the previously mentioned first direction, viz., leftwardly in FIG. 12, the degree of communication between the fluid inlet port 52 and the first fluid outlet port 53 increases and the degree of communication between the fluid inlet port 52 and the second fluid outlet port 53' decreases. The fluid delivered from the steering pressure pump 1 to the fluid feed passageway 6 is thus permitted to pass at an increasing rate to the first control passageway 12 through the first outlet port 43 and at a decreasing rate to the second control fluid passageway 12' through the second outlet port 53' as the valve spool 55 is moved closer to the end wall portion 51 of the valve housing 50. While the flow rates of fluid from the fluid feed passageway 6 to the first and second control fluid passageways 12 and 12' are being increased and decreased, respectively, the flow rates of fluid from the fluid feed passageway 6 to the fluid return passageway 11 through the first and second fluid discharge ports 54 and 54' of the valve 3 are reduced until finally the communication between the fluid inlet port 52 and the first fluid discharge port 54 is blocked by the second land 57 and the communication between the fluid inlet port 52 and each of the second fluid outlet and discharge ports 53' and 54' is blocked by the third land 58 of the spool 55. The fluid passed to the first control fluid passageway 12 at an increasing rate enters the first fluid chamber 9 of the steering power cylinder 2 and the fluid passed to the second control fluid passageway 12' is recirculated through the second fluid chamber 9' of the power cylinder 2 and the fluid return passageway 11. The piston 8 of the power cylinder 2 is accordingly forced to move in the cylinder housing 7 in a direction to cause the first fluid chamber 9 to expand and the second fluid chamber 9' to contract by the differential fluid pressure which acts on the piston 8. The piston 8 of the power cylinder 2 is in these manners forced to move in a direction to steer the vehicle leftwardly not only by the manual steering effort transmitted from the steering wheel 47 to the piston 8 through the steering gear assembly 48 but also the differential fluid pressure thus exerted on the piston 8. The movement of the piston 8 is transmitted to the wheel axles of front road wheels, respectively, which are accordingly driven to turn about the center axes of the king pins. The driver's steering effort applied to the steering wheel 47 is in this fashion assisted by the differential fluid pressure exerted on the piston 8 of the steering power cylinder 2.

When, on the other hand, the steering wheel 47 is being turned in a right-turn direction away from the straight-ahead position thereof, the voltage signal Ef appears with a positive polarity at the output terminal of the buffer amplifier 73'. The positive voltage signal Ef is fed to each of the first, second and third function generators 75', 76' and 77', which is therefore caused to produce the voltage signals $F_1'$, $F_2'$ and $F_3'$ as described above. One of the signals $F_1'$, $F_2'$ and $F_3'$ is passed through the rotary switch unit 78 depending upon the angular position of the movable contact element 78d thereof and is modified at the first node $N_1'$ by the signal $F_4'$ and at the second node $N_2'$ by the signal $Fd'$. A current Ic' variable with the voltage $F_1'-F_4'-Fd'$, $F_2'-F_4'-Fd'$ or $F_2'-F_4'-Fd'$ is therefore supplied from the voltage-to-current converter 81 is fed to the solenoid coil 82' of the second solenoid-operated valve actuator 64' shown in FIG. 12. The coil 81' being energized with the current Ic' thus delivered from the right-turn steering pressure control network 72', the valve spool 55 of the pressure control valve 3 is moved from the neutral position thereof in the previously mentioned second direction, viz., rightwardly in FIG. 12, the degree of communication between the fluid inlet port 52 and the second fluid outlet port 53' increases and the degree of communication between the fluid inlet port 52 and the first fluid outlet port 53 decreases. The fluid delivered from the steering pressure pump 1 to the fluid feed passageway 6 is thus permitted to pass at an increasing rate to the second control passageway 12' through the second outlet port 53' and at a decreasing rate to the first control fluid passageway 12 through the first outlet port 53 as the valve spool 55 is moved closer to the end wall portion 51' of the valve housing 50. While the flow rates of fluid from the fluid feed passageway 6 to the first and second control fluid passageways 12 and 12' are being decreased and increased, respectively, the flow rates of fluid from the fluid feed passageway 6 to the fluid return passageway 11 through the first and second fluid discharge ports 54 and 54' of the valve 3 are reduced until finally the communication between the fluid inlet port 52 and each of the first fluid outlet and discharge ports 53 and 54 is blocked by the second land 57 and the communication between the fluid inlet port 52 and the second fluid discharge port 54' is blocked by the third land 58 of the spool 55. The fluid passed to the second control fluid passageway 12' at an increasing rate enters the second fluid chamber 9' of the steering power cylinder 2 and the fluid passed to the first control fluid passageway 12 is recirculated through the first fluid chamber 9 of the power cylinder 2 and the fluid return passageway 11. The piston 8 of the power cylinder 2 is accordingly forced to longitudinally move in the cylinder housing 7 in a direction to cause the first fluid chamber 9 to contract and the second fluid chamber 9' to expand by the differential fluid pressure which acts on the piston 8. The piston 8 of the power cylinder 2 is in these manners forced to move in a direction to steer the vehicle rightwardly by the manual steering effort transmitted from the steering wheel 47 to the piston 8 through the steering gear assembly 48 and the differential fluid pressure thus exerted on the piston 8.

Figure 15:
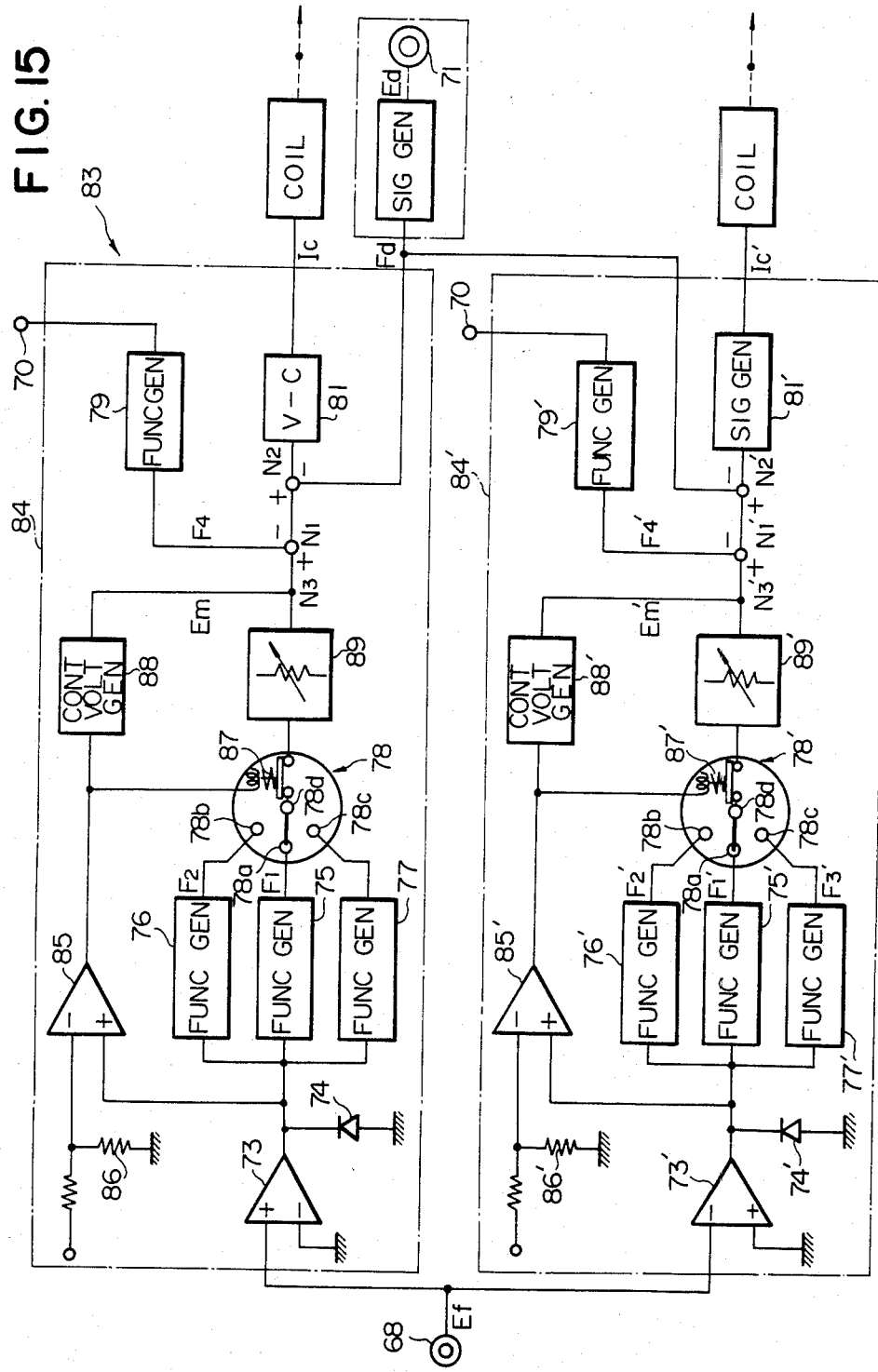
FIG. 15 is similar to FIG. 13 but shows another preferred form of valve control circuit for the valve actuators of the steering pressure control valve forming part of the steering control apparatus shown in FIG. 12.

FIG. 15 shows a modification of the valve control circuit described with reference to FIG. 4. The valve control circuit, now designated in its entirety by reference numeral 83, also consists of first and second or left-turn and right-turn steering pressure control networks 84 and 84' connected to the coils 82 and 82' of the first and second solenoid-operated valve actuators 64 and 64', respectively, of the pressure control valve 3 shown in FIG. 12. The left-turn steering pressure control network 84 comprises, in addition to the component units of the pressure control network 72 of the control circuit 67 shown in FIG. 13, an operational amplifier 85 having a positive-polarity input terminal connected to the output terminal of the buffer amplifier 73 of the left-turn steering pressure control network 72 and a negative-polarity input terminal grounded through a resistor 86. The operational amplifier 85 is thus responsive to the voltage signal Ef and is adapted to produce an output signal when the voltage signal Ef appearing at the output terminal of the buffer amplifier 73 is higher than a predetermined value which is representative of a predetermined value of the manual steering effort applied to the steering wheel 47. The operational amplifier 85 has an output terminal connected on one hand to a suitable control element such as an exciting coil of a normally-closed switch such as a relay 87 and on the other hand to a basic control voltage generator 88. The relay 87 has a normally-closed contact set intervening between the movable contact element 78d of the rotary switch unit 78 and the first node $N_1$ through a variable-factor amplifier 89. The relay 87 is, thus, adapted to have its contact set closed and open in the absence and presence, respectively, of a signal at the output terminal of the operational amplifier 85. The variable-factor amplifier 89 has an input terminal connected to the movable contact element 78d of the rotary switch unit 78 and the output terminal of the operational amplifier 85 across the relay 87 and an output terminal connected to the node $N_1$ as shown. Though not shown in the drawings, the variable-factor amplifier 89 has its feedback resistor replaced by a variable resistor and has an amplification factor continuously variable with the resistance value of the resistor. The variable-factor amplifier 89 is thus constructed and arranged so that the target differential fluid pressure to be developed between the fluid chambers 9 and 9' of the steering power cylinder 2 (FIG. 12) is variable with the detected manual steering effort and the detected vehicle speed at a rate which is continuously variable with the resistance value of the feedback resistor forming part of the amplifier 89. On the other hand, the basic control voltage generator 88 has an input terminal connected to the output terminal of the operational amplifier 85 and an output terminal connected to a third node $N_3$ between the first node $N_1$ and the output terminal of the variable-factor amplifier 89. The voltage generator 88 is responsive to the output signal from the operational amplifier 85 and is operative to produce at its output terminal a voltage Em corresponding to a predetermined maximum differential fluid pressure between the first and second fluid chambers 9 and 9' of the steering power cylinder 2 shown in FIG. 12. The second or right-turn steering pressure control network 84' is constructed and arranged similarly to the above described pressure control network 84. For this reason, the component elements and units of the control network 84' are designated by adding primes to the reference numerals denoting the individual component elements and units of the control network 84 for omitting the detailed description.

Figure 16:
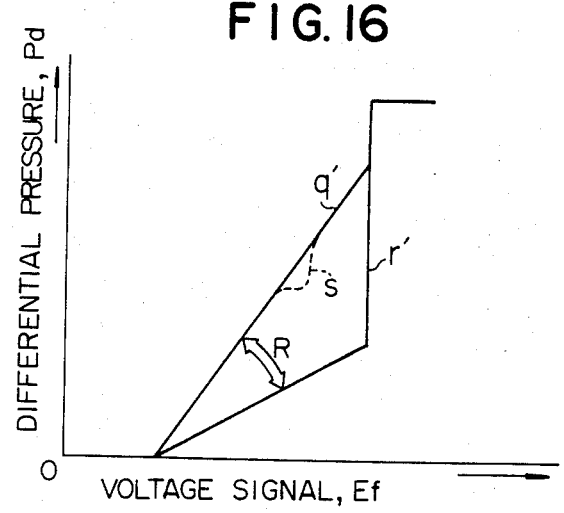
FIG. 16 is a graph showing examples of basic modes of control over the differential pressure to be developed in the steering power cylinder forming part of the steering control apparatus shown in FIG. 12 as achieved by the valve control circuit illustrated in FIG. 15.

When, now, the steering wheel 47 (FIG. 12) is being turned in, for example, a left-turn direction with a driver's manual steering effort smaller than the predetermined value registered in the operational amplifier 85, the normally-closed contact set of the relay 89 remains closed in the absence of a signal at the output terminal of the operational amplifier 85. One of the voltage signals $F_1$, $F_2$ and $F_3$ is therefore passed through the rotary switch unit 78 as in the pressure control network 72 of the control circuit 67 described with reference to FIG. 13. The $F_1$, $F_2$ or $F_3$ is further passed through the contact set of the relay 89 and is supplied to the variable-factor amplifier 89. If the first function generator 75 is selected in this instance, the target differential fluid pressure Pd is given by the relation $Pd = c \cdot f_1(T, V)$ where c is a parameter variable with the amplification factor of the amplifier 89, T is the manual steering effort or torque represented by the voltage signal Ef and V is the vehicle speed represented by the voltage signal Ev. If the third function generator 77 is selected, the target differential fluid pressure Pd' is likewise given by the relation $Pd' = c \cdot f_3(T, V)$. FIG. 14 shows examples of the relationships between the detected manual steering effort represented by the voltage signal Ef and the target differential fluid pressures Pd which are thus determined depending upon the detected vehicle speed and corrected on the basis of the detected manual steering effort. In FIG. 14, plots q' and r' show the relationships between the detected manual steering efforts and the target differential fluid pressures at the vehicle speeds of 50 km/hr and 120 km/hr, respectively. When the manual steering effort applied to the steering wheel 47 is smaller than the predetermined value registered in the operational amplifier 85, the target differential fluid pressure to be developed between the first and second fluid chambers 9 and 9' of the connected to is thus controlled continuously in the range indicated by arrowheads R in FIG. 16 if the basic mode of steering assistance control registered in the first function generator 75 is selected. The voltage signal produced by the variable-factor amplifier 89 as above described is modified at the first node $N_1$ with the voltage signal $F_4$ and at the second node $N_2$ further with the voltage signal Fd in manners previously described with reference to FIG. 13. The target differential fluid pressure to be developed between the fluid chambers 9 and 9' of the connected to is reduced as a result of the modification of the target differential fluid pressure determined by the variable-factor amplifier 89 so that the steering assistance achieved by the vehicle steering system is reduced as indicated by curve s in broken line in FIG. 16. The voltage signal thus produced at the second node $N_2$ is supplied to the coil 82 of the first solenoid-operated valve actuator 64 shown in FIG. 12 so that the differential fluid pressure to be developed across the piston 8 of the cylinder 2 in accordance with the signal impressed on the coil 82.

If the manual steering effort applied to the steering wheel 47 (FIG. 12) being turned in the left-turn direction is larger than a predetermined value and accordingly the voltage signal supplied through the buffer amplifier 73 is higher than the predetermined value registered on the operational amplifier 85, the normally-closed contact set of the relay 87 is made open in the presence of a signal at the output terminal of the operational amplifier 85. Under these conditions, the basic control voltage generator 88 is operative to produce an output voltage signal Em representative of the predetermined maximum differential fluid pressure to be developed between the first and second fluid chambers 9 and 9' of the power cylinder 2. The voltage signal Em is modified at the first node $N_1$ with the voltage signal $F_4$ and at the second node $N_2$ further with the voltage signal Fd, producing a voltage Em $-F_4$ at the first node $N_1$ and a voltage Em $-F_4-$Fd at the second node $N_2$. The voltage signal Em $-F_4-$Fd is supplied to the coil 82 of the first solenoid-operated valve actuator 64 shown in FIG. 12 so that the differential fluid pressure to be developed across the piston 8 of the cylinder 2 in accordance with the signal impressed on the coil 82.

What is claimed is:

1. A fluid-operated steering control apparatus for a power-assisted vehicle steering system for a vehicle having a steerable road wheel and a manually driven steering wheel, comprising
   a steering pressure pump;
   a steering power cylinder which comprises a piston coupled to said steerable road wheel and which has first and second fluid chambers formed across the piston, the piston being axially movable by a differential fluid pressure developed between the first and second fluid chambers;

a steering pressure control valve intervening between said steering power cylinder and said steering pressure pump and operative to direct fluid under pressure from the steering pressure pump selectively to one of the first and second fluid chambers of the power cylinder and to drain fluid from the other of the fluid chambers at variable rates for developing a differential fluid pressure across said piston; and fluid flow control valve means bypassing said pressure control valve and comprising a valve member movable in first and second directions to provide increasing and decreasing the rate of bypass fluid;

solenoid-operated valve actuating means operative to actuate the valve member of the fluid flow control valve means to move in one of the first and second directions of movement thereof, parameter detecting means for detecting a variable operational parameter of the vehicle and producing an output signal representative of the detected value of the operational parameter, and a valve control circuit electrically connected to said valve actuating means and said parameter detecting means and comprising a plurality of signal generators each having stored therein a set of information representative of a predetermined relationship between said operational parameter and desired flow rates of fluid through the fluid flow control valve means, the respective relationships represented by the sets of information stored in said signal generators being different from each other, each of the signal generators being responsive to the output signal from said parameter detecting means and being operative to produce an output signal representative of a target flow rate of fluid through the fluid flow control valve means in response to the output signal from said parameter detecting means, said valve actuating means being operative selectively on the basis of one of the respective output signals from said signal generators.

2. A fluid-operated steering control apparatus as set forth in claim 1, in which said valve control circuit further comprises switch means operatively intervening between each of said signal generators and said valve actuating means for actuating the valve actuating means selectively on the basis of one of the respective output signals from the signal generators.

3. A fluid-operated steering control apparatus as set forth in claim 2, in which said valve control circuit further comprises a variable-factor amplifier connected between said switch means and said solenoid-operated valve actuating means.

4. A fluid-operated steering control apparatus as set forth in claim 1, in which said parameter detecting means comprises a vehicle-speed sensor responsive to vehicle speed and operative to produce an output signal representative of the detected vehicle speed and steering velocity detecting means responsive to angular velocity of turn of the steering wheel and operative to produce an output signal representative of the detected angular turning velocity of the steering wheel, said signal generators comprising a first signal generator operative to calculate a desired flow rate of fluid through said fluid flow control valve means to achieve a maximum desired volumetric increment of the fluid to be directed into one of the fluid chambers of said steering power cylinder when the steering wheel is being turned at the angular velocity represented by the output signal from said velocity detecting means , the first signal generator being further operative to produce an output signal representative of the fluid flow rate thus calculated, a second signal generator responsive to the output signal from said vehicle-speed sensor and operative to calculate a desired flow rate of fluid through said fluid flow control valve means for the vehicle speed represented by the output signal from the vehicle-speed sensor and to produce an output signal representative of the desired flow rate of fluid thus calculated, and a third signal generator responsive to the respective output signals from the first and second signal generators and operative to produce an output signal representative of the sum of the fluid flow rates, respectively, represented by the two input signals, said valve actuating means being operative on the basis of the output signal from said third signal generator.

5. A fluid-operated steering control apparatus for a power-assisted vehicle steering system for a vehicle having a steerable road wheel and a manually driven steering wheel, comprising a steering pressure pump;

a steering power cylinder which comprises a piston coupled to said steerable road wheel and which has first and second fluid chambers formed across the piston, the piston being axially movable by a differential fluid pressure developed between the first and second fluid chambers; and a steering pressure control valve intervening between said steering power cylinder and said steering pressure pump and operative to direct fluid under pressure from the steering pressure pump selectively to one of the first and second fluid chambers of the power cylinder and to drain fluid from the other of the fluid chambers at variable rates for developing a differential fluid pressure across said piston, the pressure control valve comprising solenoid-operated valve actuating means operative to control the flow rate of fluid through said steering pressure control valve, parameter detecting means for detecting a variable operational parameter of the vehicle and producing an output signal representative of the detected value of the operational parameter, and a valve control circuit electrically connected to said valve actuating means and said parameter detecting means and comprising a plurality of function generators each having stored therein a set of information representative of a predetermined relationship between said operational parameter and the differential fluid pressures to be developed between the first and second fluid chambers of said power cylinder, the respective relationships represented by the sets of information stored in said function generators being different from each other, each of the function generators being responsive to the output signal from said parameter detecting means and being operative to produce an output signal representative of a target differential fluid pressure to be developed between the first and second fluid chambers of said power cylinder in response to the output signal from said parameter detecting means, said valve actuating means being operative selectively on the basis of one of the respective output signals from said function generators.

6. A fluid-operated steering control apparatus as set forth in claim 5, in which said steering pressure control valve comprises
- a valve housing formed with a fluid inlet port communicating with the suction port of the pump, first and second fluid outlet ports communicating with said first and second fluid chambers, respectively, of the power cylinder and a fluid discharge port communicating with the suction port of the pump, and
- a valve member movable within said valve housing in a first direction to provide an increasing degree of communication between the fluid inlet port and the first outlet port and a decreasing degree of communication between the fluid inlet port and the second outlet port and a second direction to provide an increasing degree of communication between the fluid inlet port and the second outlet port and a decreasing degree of communication between the fluid inlet port and the first outlet port,
- said valve actuating means comprising first and second solenoid-operated valve actuators which are operative to actuate the valve member of the pressure control valve to move in the first and second directions, respectively, of movement thereof when electrically energized,
- said valve control circuit comprising first and second pressure control networks electrically connected to said first and second solenoid-operated valve actuators, respectively, each of the pressure control networks comprising, in addition to said function generators, switch means operatively intervening between each of said function generators and one of said valve actuators for actuating the valve actuator selectively on the basis of one of the respective output signals from the function generators.

7. A fluid-operated steering control apparatus as set forth in claim 6, in which said parameter detecting means comprising a steering-effort sensor for detecting a manual steering effort applied to the steering wheel and producing an output signal representative of the detected manual steering effort and a vehicle-speed sensor for detecting vehicle speed and producing an output signal representative of the detected vehicle speed, at least one of said function generators being responsive to the output signal from said vehicle-speed sensor and having stored therein a set of information representative of a predetermined relationship between the manual steering efforts applied to the steering wheel and target differential fluid pressures to be developed between the first and second fluid chambers, at least one of said function generators being operative to produce an output voltage signal representative of a target differential fluid pressure optimum for the manual steering effort represented by the signal from the vehicle-speed sensor, each of at least two of said function generators having stored therein a set of information representative of predetermined relationships among manual steering efforts applied to the steering wheel, vehicle speeds and target differential fluid pressures to be developed between said first and second fluid chambers in response to the manual steering efforts and vehicle speeds and being operative to produce output voltage signals, respectively, representative of a target differential fluid pressure optimum for the manual steering effort represented by the signal from the steering-effort sensor and the vehicle speed represented by the signal from the vehicle-speed sensor.

8. A fluid-operated steering control apparatus as set forth in claim 7, in which said parameter detecting means further comprises a steering-velocity sensor responsive to angular velocity of turn of the steering wheel and operative to produce an output signal representative of the detected angular turning velocity of the steering wheel and a differential-pressure sensor responsive to the differential fluid pressure developed between the first and second fluid chambers of said steering power cylinder and operative to produce an output signal representative of the detected differential fluid pressure, the pressure control networks of said valve control circuit further comprising an additional function generator which has stored therein a set of information representative of a predetermined relationship between angular velocities of turn of the steering wheel and desired target differential fluid pressures to be developed between the first and second fluid chambers of said steering power cylinder for the turning velocities of the steering wheel, the additional function generator having an input terminal connected to said steering-velocity sensor and being operative to produce an output voltage signal representative of a target differential fluid pressure optimum for the detected angular velocity of turn of the steering wheel, a signal generator operative to compare the output signal from said differential-pressure sensor with a target differential fluid pressure to be developed between the first and second fluid chambers of said steering power cylinder and to produce an output voltage signal representative of the difference between the target differential fluid pressure and the differential fluid pressure represented by the signal from the differential-pressure sensor, and signal combining means operatively connected among said switch means, said additional function generator and said signal generator for combining the voltage signal from one of said function generators with the voltage signal from the additional function generator the voltage signal from the signal generator for producing a voltage signal representative of the differential fluid pressure initially represented by the signal from one of the function generators and modified with the respective signals from the additional function generator and the signal generator, each of said first and second valve actuators being operative on the basis of the voltage signal produced by the signal combining means of each of said first and second steering pressure control networks.

9. A fluid-operated steering control apparatus as set forth in claim 8, in which each of said steering pressure control networks further comprises an operational amplifier responsive to the output signal from said steering-effort sensor and operative to produce an output signal when the signal delivered from the steering-effort sensor is higher in magnitude than a value representative of a predetermined value of the manual steering effort applied to the steering wheel, a series combination of a switch and a variable-factor amplifier intervening between said switch means and said signal combining means, the switch being responsive to the output signal from said operational amplifier and being closed and open in the absence and presence, respectively, of the signal at the output terminal of the operational amplifier, a basic control voltage generator connected to said signal combining means in parallel with the series combination of said switch and said variable-factor amplifier, said basic control voltage generator being responsive to the output signal from said operational amplifier and being operative to produce a voltage signal representative of a predetermined maximum differential fluid pressure between the first and second fluid chambers of said steering power cylinder.

* * * * *